United States Patent [19]

Kern

[11] Patent Number: 5,488,671
[45] Date of Patent: Jan. 30, 1996

[54] REDUCING OPERATOR BALANCING IN A DOCUMENT PROCESSING SYSTEM EMPLOYING AUTOMATIC READING

[75] Inventor: Norman P. Kern, Birmingham, Mich.

[73] Assignee: Unisys Corporation, Blue Bell, Pa.

[21] Appl. No.: 600,777

[22] Filed: Oct. 19, 1990

[51] Int. Cl.$^6$ ..................................................... G06K 9/00
[52] U.S. Cl. .............................. 382/138; 235/379; 902/6; 902/20
[58] Field of Search ........................ 382/7, 138; 235/379; 902/6, 20

[56] References Cited

U.S. PATENT DOCUMENTS

| | | | |
|---|---|---|---|
| 4,264,808 | 4/1981 | Owens et al. ............................. | 382/7 |
| 4,813,077 | 3/1989 | Woods et al. .............................. | 382/7 |
| 4,839,504 | 6/1989 | Nakano ................................... | 235/379 |
| 4,877,947 | 10/1989 | Mori ....................................... | 235/379 |
| 4,947,479 | 8/1990 | Kawai et al. ............................ | 235/379 |

*Primary Examiner*—Leo H. Boudreau
*Attorney, Agent, or Firm*—Nathan Cass; Mark T. Starr

[57] ABSTRACT

An image-based transaction processing system employing automatic reading of machine-printed and handwritten financial amounts on transaction documents to enhance transaction balancing by reducing the number of transactions which have to be balanced by an operator. The automatic reader provides a second choice as well as a first choice for one or more digits. When an out-of-balance transaction is detected, one or more second choice digits are substituted for corresponding first choice digits in order to obtain automatic transaction balancing even through an automatically read amount is incorrect.

10 Claims, 28 Drawing Sheets

FIG. 20

CUSTOMER ADVICE MENU
1 Addition Error
2 Subtraction Error
3 Incorrect Listing
4 Listed not Included
5 Included not Listed
6 No Listing
7 Non-cash Item
8 Other Enter or select choice: 3

No. 1176
9-10 1987
$235.00
60/100 ———— DOLLARS
im T. Procurier
76

W2
| Trn | Amount | Itms |
|---|---|---|
| CR | 686.30 | 1 |
| DB | 676.30 | 6 |
| DIF | 10.00 S | |

W3 CREDITS
| Amount | Comments |
|---|---|
| 686.30 | |

END LIST

DEBITS
| Amount | Comments |
|---|---|
| 78.80 | |
| 134.00 | |
| 235.00 | |
| 58.00 | |
| 125.00 | |
| 45.50 | |

END LIST

| CHECKS | DOLLARS | CENTS |
|---|---|---|
| 1 | 78 | 80 |
| 2 | 134 | 00 |
| 3 | 245 | 00 |
| 4 | 58 | 00 |
| 5 | 125 | 00 |
| 6 | 45 | 50 |
| 7 | | |
| 8 | | |
| 9 | | |
| 10 | | |
| 11 | | |
| 12 | | |
| 13 | | |
| 14 | | |
| 15 | | |
| 16 | | |
| 17 | | |
| 18 | | |
| 19 | | |
| TOTAL | 686 | 30 |

| Aux On-Us | P44 | R/T | Acount Number | TC | Amount |
|---|---|---|---|---|---|
| | | 5264789 | 529793219 | 1176 | 23500 |

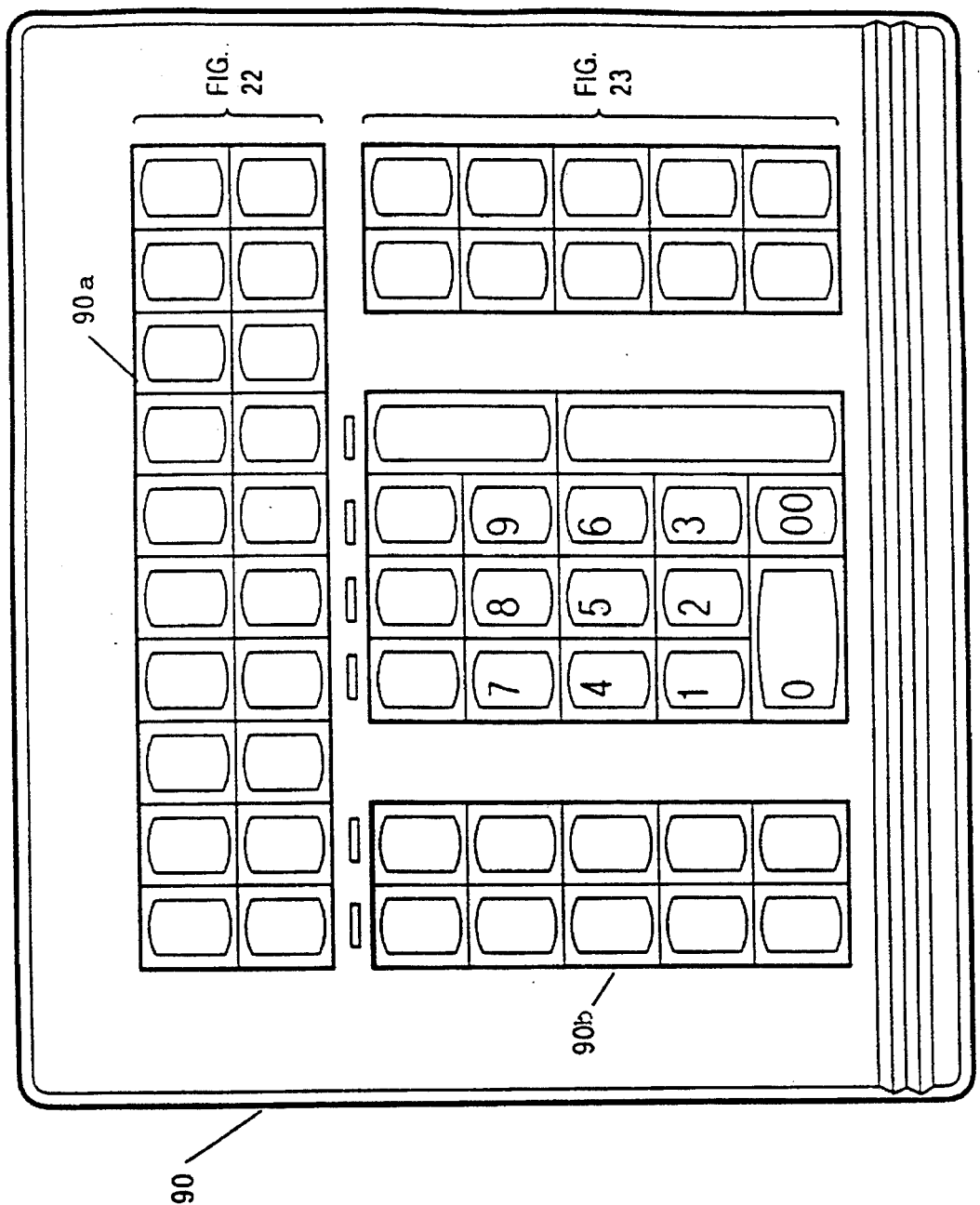

Cancel
CANCELS THE CURRENT FUNCTION.

Help
BRINGS UP AN ONLINE DESCRIPTION OF WHAT ANY FUNCTION KEY DOES. PRESS THE HELP KEY AND THEN THE KEY IN QUESTION.

Flip & Rotate
DISPLAYS THE IMAGE OF THE OPPOSITE SIDE OF AN ITEM AND TURNS IT 90 DEGREES CLOCKWISE.

Flip
DISPLAYS THE IMAGE OF THE OPPOSITE SIDE OF AN ITEM.

Rotate 90°
TURNS AN IMAGE 90 DEGREES CLOCKWISE WITHIN AN IMAGE WINDOW.

| Cancel | Help | Flip & Rotate | Flip | Rotate 90° |
|---|---|---|---|---|
| Shift | Logoff | Accept Out of Balnce | Out of Balnce Rcnsdr | Recon- sider |

90a

| FIG 22A | FIG 22B |
|---|---|

FIG 22

Shift
COMBINES WITH UP- OR DOWN-ARROW KEYS TO PAGE UP OR DOWN THROUGH CALCULATOR RECORDS.

Logoff
INDICATES TO THE SYSTEM THAT YOU WISH TO LOG OFF.

Acceptably Out of Balance
MARKS AN OUT-OF-BALANCE BLOCK AS ACCEPTABLE, ALLOWING IT TO BE TREATED AS IF IT WERE IN BALANCE.

Out-of-Balance Reconsider
MARKS AN OUT-OF-BALANCE BLOCK AS ACCEPTABLE, BUT SUGGESTS THAT YOU LOOK AT IT AGAIN IF YOU CAN.

Reconsider
MARKS AN OUT-OF-BALANCE BLOCK WITH THE RECONSIDER OPTION; YOU SHOULD LOOK AT IT AGAIN IF YOU CAN.

FIG. 22A

| Zoom | Reverse Video | Print Screen | Print Master | Advise |
|---|---|---|---|---|
| MAGNIFIES AN IMAGE WITHIN AN IMAGE WINDOW OR RETURNS A ZOOMED IMAGE TO ITS ORIGINAL SIZE. | CHANGES DARK AREAS OF AN IMAGE LIGHT AND LIGHT AREAS DARK. | PRINTS THE CURRENT SCREEN DISPLAY. | INITIATES PRINTING OF THE MASTER LIST; A CONFIRMATIONS MESSAGE IS DISPLAYED IN THE OPERATOR DIALOGUE WINDOW. | CAUSES THE ADVISE MENU TO BE DISPLAYED IN THE OPERATOR DIALOG WINDOW. |

[Buttons: Zoom | Revrse Video | Print Screen | Print Master List | Advise]
[Buttons: Power Encode Outsrt | Batch Recap | Block Recap | Block Pass | Review Item]

90a

| Power Encode Outsort | Batch Recap | Block Recap | Block Pass | Review Item |
|---|---|---|---|---|
| MARKS AN ITEM FOR OUTSORT AT POWER ENCODE. | CAUSES SUMMARY INFORMATION ABOUT THE BATCH THAT IS CURRENTLY BEING BALANCED TO BE DISPLAYED. | CAUSES SUMMARY INFORMATION ABOUT THE BATCH THAT IS CURRENTLY BEING BALANCED TO BE DISPLAYED. | ENABLES YOU TO PASS ON A BLOCK OF WORK. | CAUSES ITEM REVIEW INFORMATION TO BE DISPLAYED IN THE OPERATOR DIALOGUE WINDOW. |

FIG. 22B

Supervisor Function

RESERVED FOR SUPERVISOR USE.

Calculator

CAUSES THE ONLINE CALCULATOR TO BE DISPLAYED IN THE OPERATOR DIALOGUE WINDOW.

↑ MOVES AN IMAGE WITHIN THE WINDOW SO THAT YOU CAN SEE THE TOP PORTION OF THE IMAGE. ALSO MOVES THE HIGHLIGHT BARS UP A LIST OF ITEMS.

↓ MOVES AN IMAGE WITHIN THE WINDOW SO THAT YOU CAN SEE THE BOTTOM PORTION OF THE IMAGE. ALSO MOVES THE HIGHLIGHT BAR UP A LIST OF ITEMS.

← MOVES AN IMAGE WITHIN THE WINDOW SO THAT YOU CAN SEE THE LEFT SIDE OF THE IMAGE.

Clear  90B

CLEARS THE CURRENT INPUT FIELD AND PLACES THE CURSOR IN THE HOME POSITION.

Backspace

MOVES THE CURSOR ONE SPACE TO THE LEFT.

Recall

RETRIEVES THE IMAGE JUST TRANSMITTED IN AMOUNT REKEY.

Pass

REMOVES THE CURRENT BATCH OR DEPOSIT FROM THE SCREEN AND ENABLES YOU TO SELECT ANOTHER ONE.

→ MOVES AN IMAGE WITHIN THE WINDOW SO THAT YOU CAN SEE THE RIGHT SIDE OF THE IMAGE.

| FIG 23A | FIG 23B | FIG 23C |

Dash
PLACES A DASH SYMBOL AT THE POSITION OF THE CURSOR.

Space
PLACES A SPACE AT THE POSITION OF THE CURSOR.

Transaction Code
INDICATES TO THE SYSTEM THAT THE DIGITS JUST ENTERED WERE A TRANSACTION CODE.

Credit/ Enter
INDICATES TO THE SYSTEM THAT THE IMAGE YOU WERE JUST WORKING ON WAS A CREDIT.

Debit/ Enter
INDICATES TO THE SYSTEM THAT THE IMAGE YOU WERE JUST WORKING ON IS A CREDIT. ALSO TRANSMITS MENU AND IMAGE SELECTIONS TO THE SYSTEM.

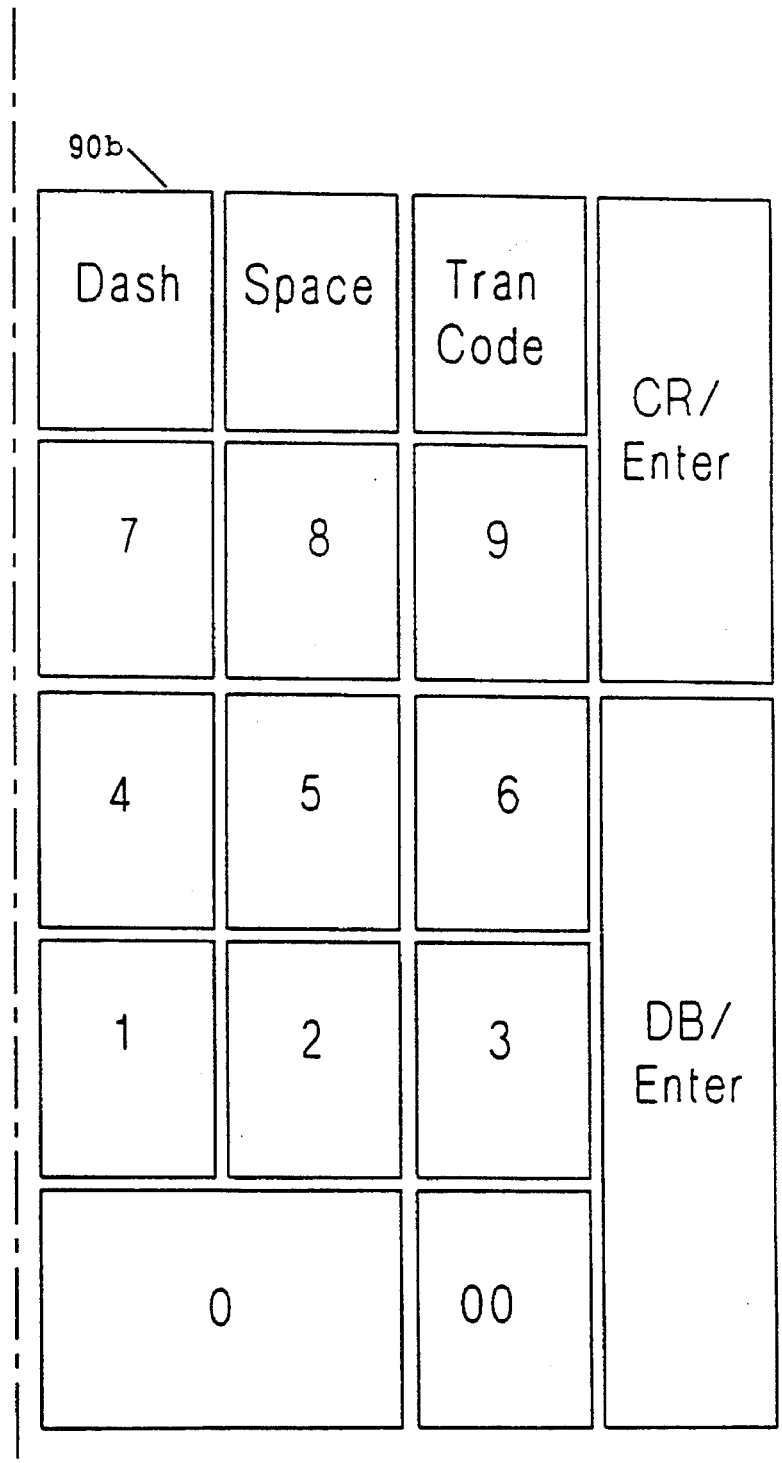

FIG. 23B

Backward Window
ACTIVATES THE WINDOW THAT PRECEDES THE ONE THAT IS CURRENTLY ACTIVE.

Forward Window
ACTIVATES THE WINDOW THAT FOLLOWS THE ONE THAT IS CURRENTLY ACTIVE.

Backward Field
ACTIVATES THE FIELD THAT PRECEDES THE ONE THAT IS CURRENTLY ACTIVE.

Forward Field
ACTIVATES THE FIELD THAT FOLLOWS THE ONE THAT IS CURRENTLY ACTIVE.

Insert Item
ENABLES YOU TO KEY IN THE CODE LINE OF AN ITEM TO BE ADDED TO THE CONTROL GROUP CURRENTLY BEING BALANCED.

Delete Item
REMOVES A SELECTED ITEM FROM THE CONTROL GROUP CURRENTLY BEING BALANCED.

Display Free Items
ENABLES YOU TO VIEW THE ITEMS AVAILABLE IN THE FREE ITEM STORE.

Get Free Item
RETRIEVES AN ITEM FROM THE FREE ITEM STORE AND PLACES IT INTO THE CONTROL GROUP CURRENTLY BEING BALANCED.

Make Free Item
REMOVES AN ITEM FROM THE CONTROL GROUP CURRENTLY BEING BALANCED AND PLACES IT INTO THE FREE ITEM STORE.

| Bkward Window | Forwrd Window |
|---|---|
| Bkward Field | Forwrd Field |
| Insert Item | Delete Item |
|  | Disply Free Items |
| Get Free Item | Make Free Item |

FIG. 23C

CUSTOMER CORRECTION

BANK NAME    ACCOUNT NUMBER    BRANCH NUMBER

YOUR DEPOSIT OF 02/02/88 TOTALLING $686.30 CONTAINED AN ERROR. CHECK #3 FOR $235.00 WAS INCORRECTLY LISTED AS $245.00.

YOUR ACCOUNT HAS BEEN DEBITED $10.00. PLEASE ADJUST YOUR RECORDS ACCORDINGLY.

| CHECKS | $ | ¢ |
|---|---|---|
| 1 | 78 | 80 |
| 2 | 134 | 00 |
| 3 | 245 | 00 |
| 4 | 58 | 00 |
| 5 | 125 | 00 |
| 6 | 45 | 50 |
| 7 | | |
| 8 | | |
| 9 | | |
| 10 | | |
| 11 | | |
| 12 | | |
| 13 | | |
| 14 | | |
| 15 | | |
| 16 | | |
| TOTAL | 686 | 30 |

WILLIAM J. PROCUNIER    No. 1176

9-10  19 87

PAY TO *Public Service & Gas*   $235.00

*Two hundred Thirty-five & 00/100* DOLLARS

FIRST BANK WESTERN

FOR *Void*    *William J Procunier*

⑆092900228⑆ ⑈584461201⑈ 1176

James C. Morrison
1765 Sheridan Dr.
Your City, USA 60618

Figure 25

REDUCING OPERATOR BALANCING IN A DOCUMENT PROCESSING SYSTEM EMPLOYING AUTOMATIC READING

CROSS REFERENCE TO RELATED PATENT APPLICATIONS

This patent application is related to the following concurrently filed patent applications:

U.S. Ser. No. 07/420,090, filed Oct. 10, 1989, now U.S. Pat. No. 5,206,915

U.S. Ser. No. 07/420,098, filed Oct. 10, 1989, now U.S. Pat. No. 5,237,158

U.S. Ser. No. 07/420,094, filed Oct. 10, 1989, now U.S. Pat. No. 5,221,830

U.S. Ser. No. 07/420,089, filed Oct. 10, 1989

U.S. Ser. No. 07/420,104, filed Oct. 10, 1989, now U.S. Pat. No. 5,120,944.

U.S. Ser. No. 07/420,100, filed Oct. 10, 1989

U.S. Ser. No. 07/419,568, filed Oct. 10, 1989

BACKGROUND OF THE INVENTION

The present invention relates generally to improved means and methods for processing documents using electronic imaging, and more particularly, to the use of electronic imaging for processing financial documents, such as checks and related documents in a banking environment.

Today's financial services industry is facing the immense challenge of processing huge amounts of documents efficiently. Predictions that document payment methods would decline have not been realized. In fact, document payment methods have grown worldwide and are expected to continue increasing. There is thus a vital need to devise improved means and methods for processing such documents.

The use of imaging technology as an aid to document processing has been recognized as one way of significantly improving document processing, as disclosed, for example, in U.S. Pat. Nos. 4,205,780, 4,264,808, and 4,672,186. Generally, imaging involves optically scanning documents to produce electronic images that are processed electronically and stored on high capacity storage media (such as magnetic disc drives and/or optical memory) for later retrieval and display. It is apparent that document imaging provides the opportunity to reduce document handling and movement, since these electronic images can be used in place of the actual documents.

However, despite technological advances in imaging in recent years, prior art document processing systems employing imaging, such as disclosed in the aforementioned patents, do not realized sufficient improvements to Justify the added implementations costs.

SUMMARY AND OBJECTS OF THE INVENTION

Accordingly, it is a broad object of the present invention to provide improved means and methods for employing electronic imaging and automatic reading of handwritten and machine-printed data in a document processing system.

A more specific object of the present invention is to provide such improved means and methods in a manner which significantly improves document processing productivity by reducing the number of transactions which have to be balanced as a result of incorrect automatic reading of financial amounts on the documents.

Another object of the present invention in accordance with one or more of the foregoing objects is to provide a document processing system employing imaging which is organized for operation in a manner which significantly reduces labor costs.

Further objects of the present invention involve improvements in system architecture, workstation management, transaction balancing, lost image recovery, priority document shipment, and free and missing document management.

The specific nature of the invention as well as other objects, features advantages and uses thereof will be come evident from the following detailed description along with the accompanying drawings comprised of FIGS. 1–26.

BRIEF DESCRIPTION OF THE DRAWINGS

FIG. 20 illustrates an example of a multi-window screen display which may typically appear on a balancing work station.

FIG. 21 illustrates a typical workstation keyboard.

FIGS. 22a and 22b show the upper keys and associated functions of the keyboard of FIG. 21.

FIGS. 23a, 23b and 23c show the lower keys and associated functions of the keyboard of FIG. 21.

FIG. 25 illustrates an example of a typical customer advice letter that may be prepared by an operator at a balancing workstation.

DETAILED DESCRIPTION

Like numerals and characters refer to like elements throughout the figures of the drawings.

Figure 1:
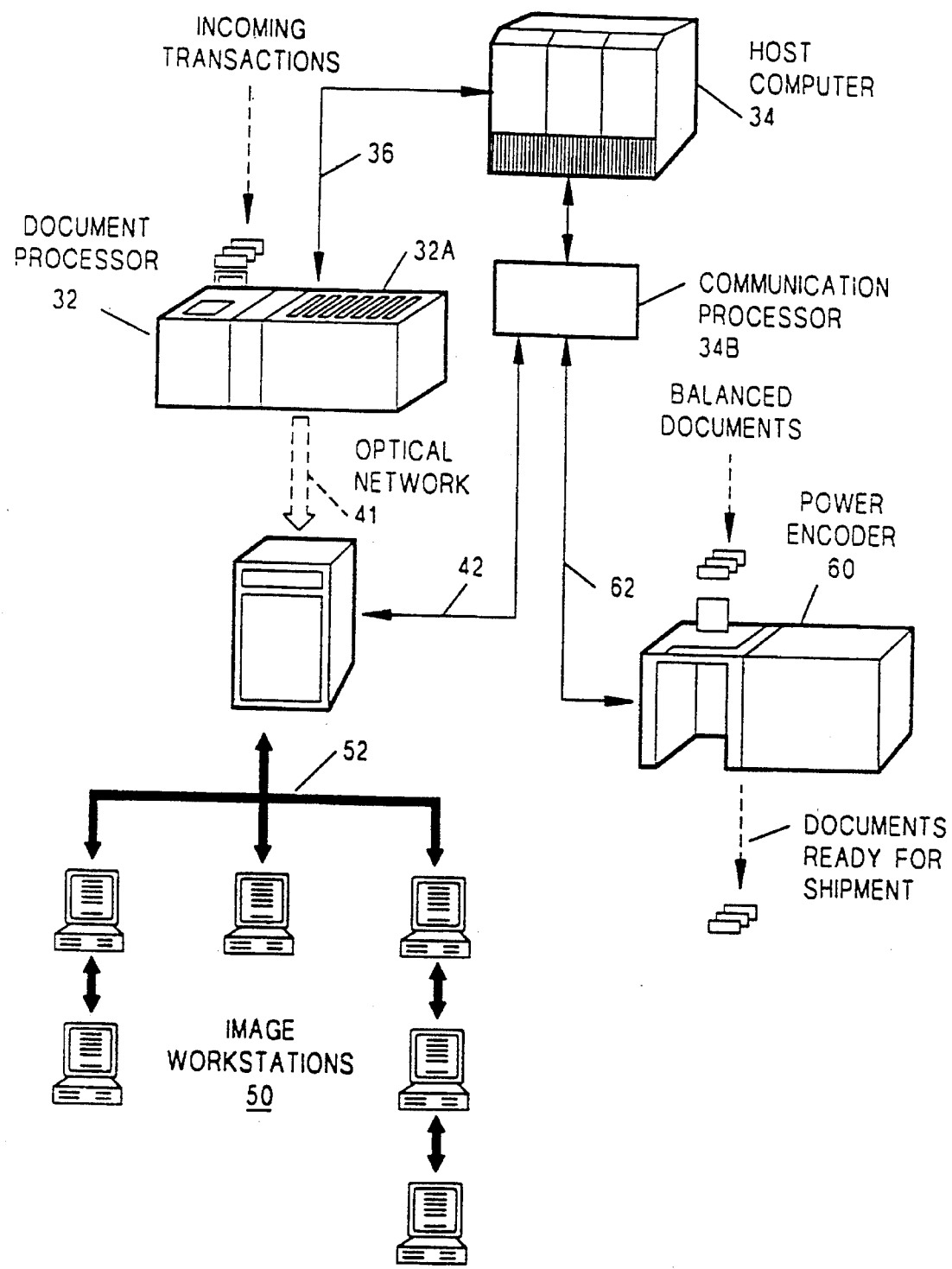
FIG. 1 generally illustrates an examplary image-based bank check processing system in accordance with the invention.

In order to demonstrate how the invention may be implemented and operated, an exemplary image-based bank check processing system, such as generally illustrated in FIG. 1, will be considered in detail. It is to be understood that this exemplary system is merely illustrative, and should not be considered as in any way limiting the scope of the invention, since the invention is applicable to other types of document processing systems, financial and otherwise.

Deposit Transactions

Before describing FIG. 1, it will be helpful to first consider the deposit type of transactions which this exemplary system will be assumed to process for the purposes of this description.

Figure 3:
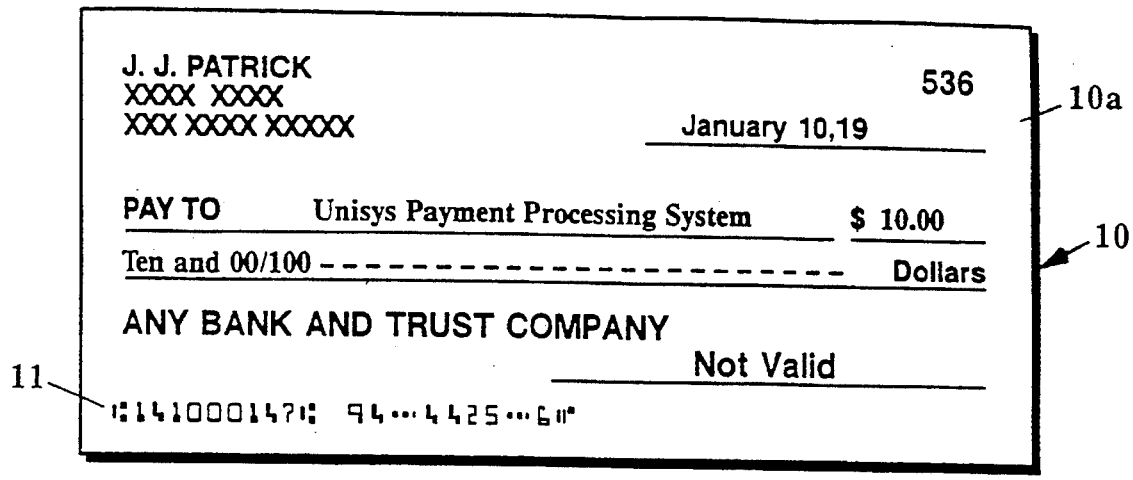
FIG. 3 illustrates the front side of a typical check.

As is well known, a very common activity within a bank involves the processing of deposits made by the bank's customers. A customer is typically one who has a checking account at the bank and, from time-to-time, makes a deposit for the purpose of depositing to his/her account one or more checks which the customer has received from others. These checks may be drawn on the same bank (on-us checks) or on other banks. FIG. 3 illustrates the front side 10a of a typical check 10.

Figure 4:
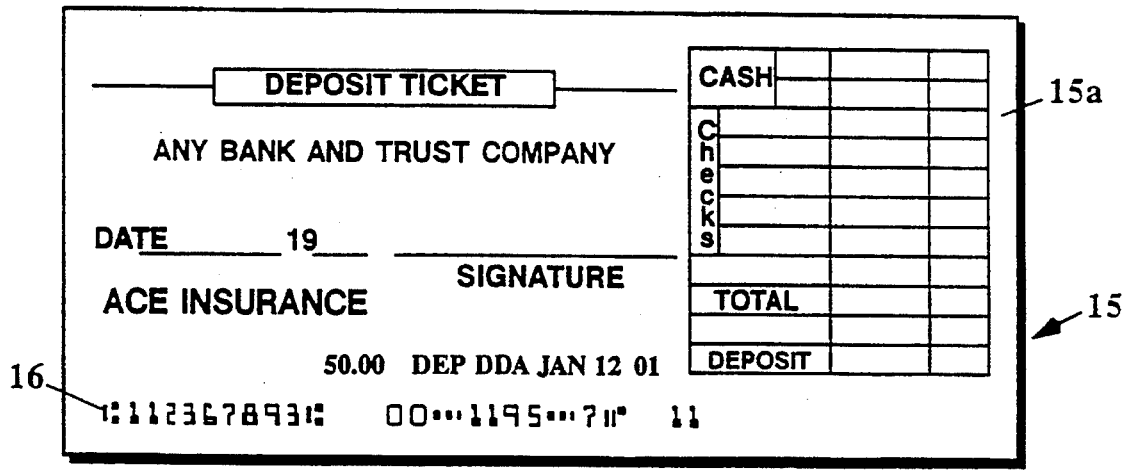
FIG. 4 illustrates the front side of a typical deposit ticket.

In order to make a deposit, a customer ordinarily fills out a deposit ticket listing the amount of each check to be deposited, and the total of all checks. FIG. 4 illustrates the front side 15a of a typical deposit ticket 15 listing for deposit only a single check for $250.00.

Figures 5, 7:
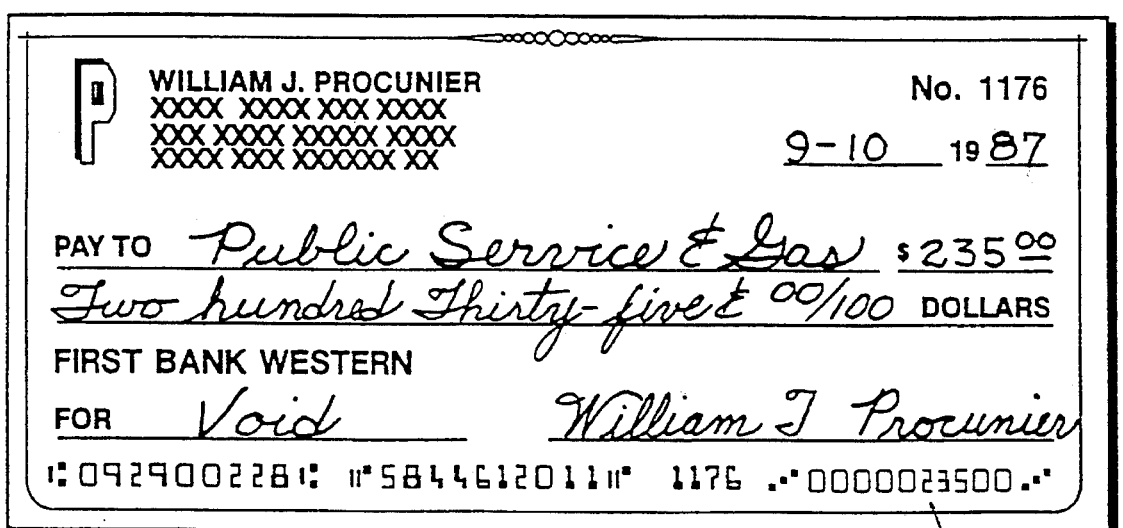
FIG. 5 illustrates the back side of a typical deposit ticket.
FIG. 7 illustrates a typical check containing an encoded amount below the signature.

If there are many checks to be deposited and insufficient space to list them on the front side 15a of the deposit ticket 15, the check amounts are then listed on the back side 15b of the deposit ticket 15, as illustrated in FIG. 5, with the total of these checks being written on the back 15b and also on the front side 15a of the deposit ticket 15.

Note that code lines 11 and 16 are provided at the bottom of the front sides 10a and 15a of both the check 10 and deposit ticket 15, respectively. These code lines 11 and 16 typically are both humanly-readable and machine-readable, and contain information which the bank uses for processing, such as the bank on which the document is drawn, a routing/transit number, the account number of the person who wrote or made out the check or deposit ticket, and a transaction code indicating the type of document. These code lines 11 and 16 are usually comprised of well known MICR (Magnetic Ink Character Recognition) data, but may alternatively be OCR (Optical Character Recognition) data. For convenience, it will be assumed for the remainder of this description that these code lines are MICR data.

Figure 6:
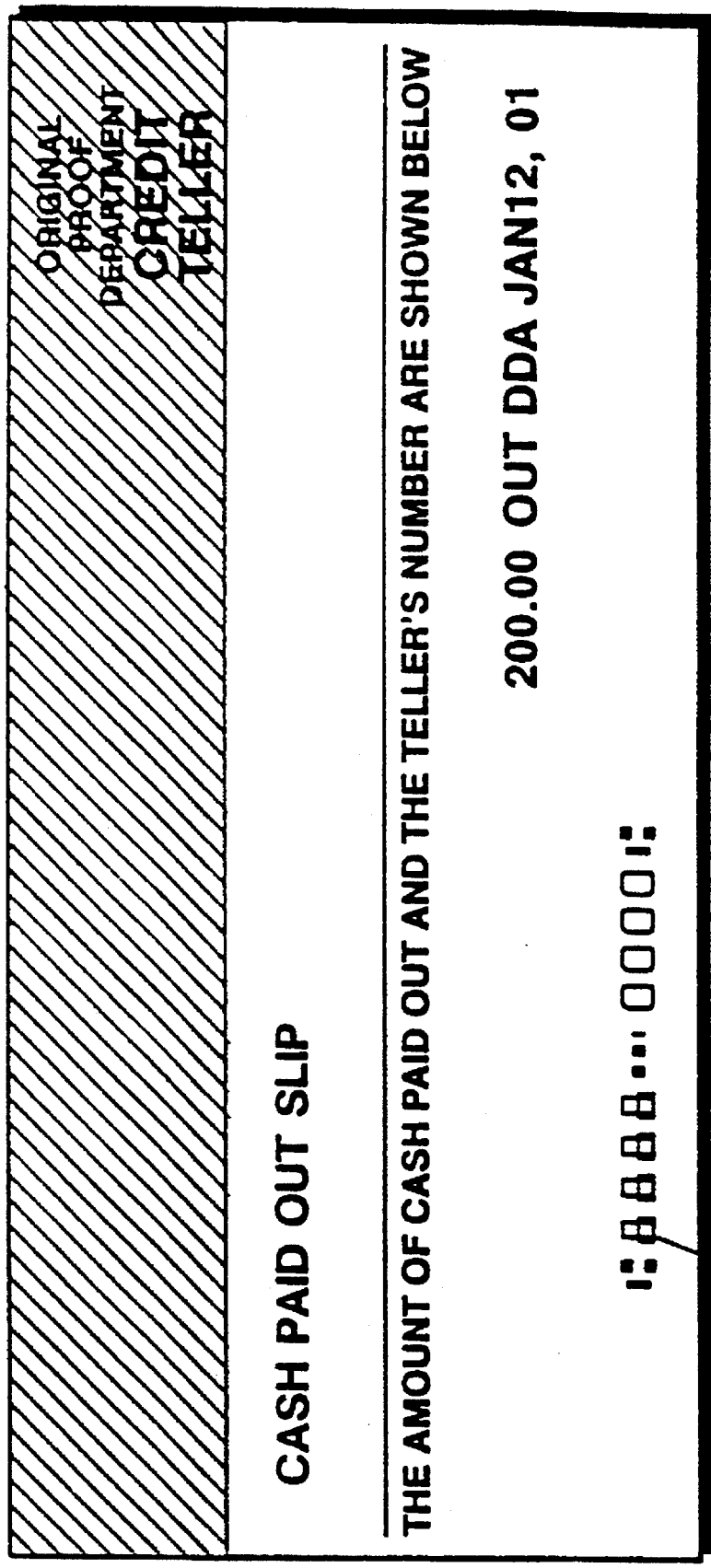
FIG. 6 illustrates a typical cash paid out slip.

A bank receives deposit tickets and associated checks for further processing from a variety of sources, such as from the bank's tellers, through-the-mail, from automated teller machines, etc. When the transaction is made at a teller window, the customer my also choose to receive a certain amount of cash, as indicated by the $200.00 amount provided on the "LESS CASH RECEIVED" line on the front side 15a of the deposit ticket 15 in FIG. 4. In such a case, the teller will then include with the check(s) and deposit ticket of the transaction, a cash paid out slip for the corresponding cash amount of $200.00, as illustrated in FIG. 6. This cash paid out slip also has a MICR code line 19.

Instead of receiving cash, the customer might wish to deposit cash into his account, in which case the customer would enter the appropriate amount into the "CURRENCY" and/or "COIN" lines adjacent the "CASH" block on the front side 15a of the deposit ticket 15(FIG. 4). The teller would then include with the check(s) and deposit slip of the transaction, a cash paid in slip (not shown), which would be generally similar to the cash paid out slip shown in FIG. 6 (including an appropriate code line), except that it would designate cash paid in instead of cash paid out.

The deposit ticket 15 along with its associated checks 10, and any cash paid in or paid out slip constitute a transaction. Other documents, such as mortage and credit card payments could also be included in a transaction. Assuming no errors have been made (by either the customer or the teller), the "NET DEPOSIT" line on the front side 15a of the deposit ticket 15 should equal the algebraic sum of the associated check amounts and any cash paid in or paid out amount, and also the amounts of any other types of transaction items which may be included in the transaction. When this equality is present, the transaction is said to be "balanced."

It will be appreciated that a bank is required to process large quantities of transactions, such as described above, every working day. The bank needs to process these transactions for two primary purposes:

(1) To capture data from the transaction documents in order to be able to update the bank's own customer accounts. For example, a customer who made a deposit needs to have his account updated to reflect the results of the deposit.

(2) To send out checks drawn on other banks for collection. In accordance with current banking practices, it is required that a machine-readable amount be encoded on each check which for the present description will be assumed to be MICR data. This encoded amount is conventionally placed below the signature of the person who wrote the check, in line with the check code line 11, as illustrated at 21 in FIG. 7. It will be assumed that MICR encoding is used.

In accomplishing the above purposes, it is important that a check processing system provide for proofing, which in the banking industry refers to methods and apparatus for detecting, correcting and handling transaction balancing errors. It will be understood that such errors may be produced by the customer and/or teller, or may be introduced during processing. The manner in which the processing system provides for detecting and correcting such errors, as well as preventing the introduction of errors during processing, has a very significant impact on the resultant productivity and cost effectiveness of the system. This is why the use of imaging technology in document processing is not of itself a solution to the problems associated with document processing.

General System Description

Figure 2:
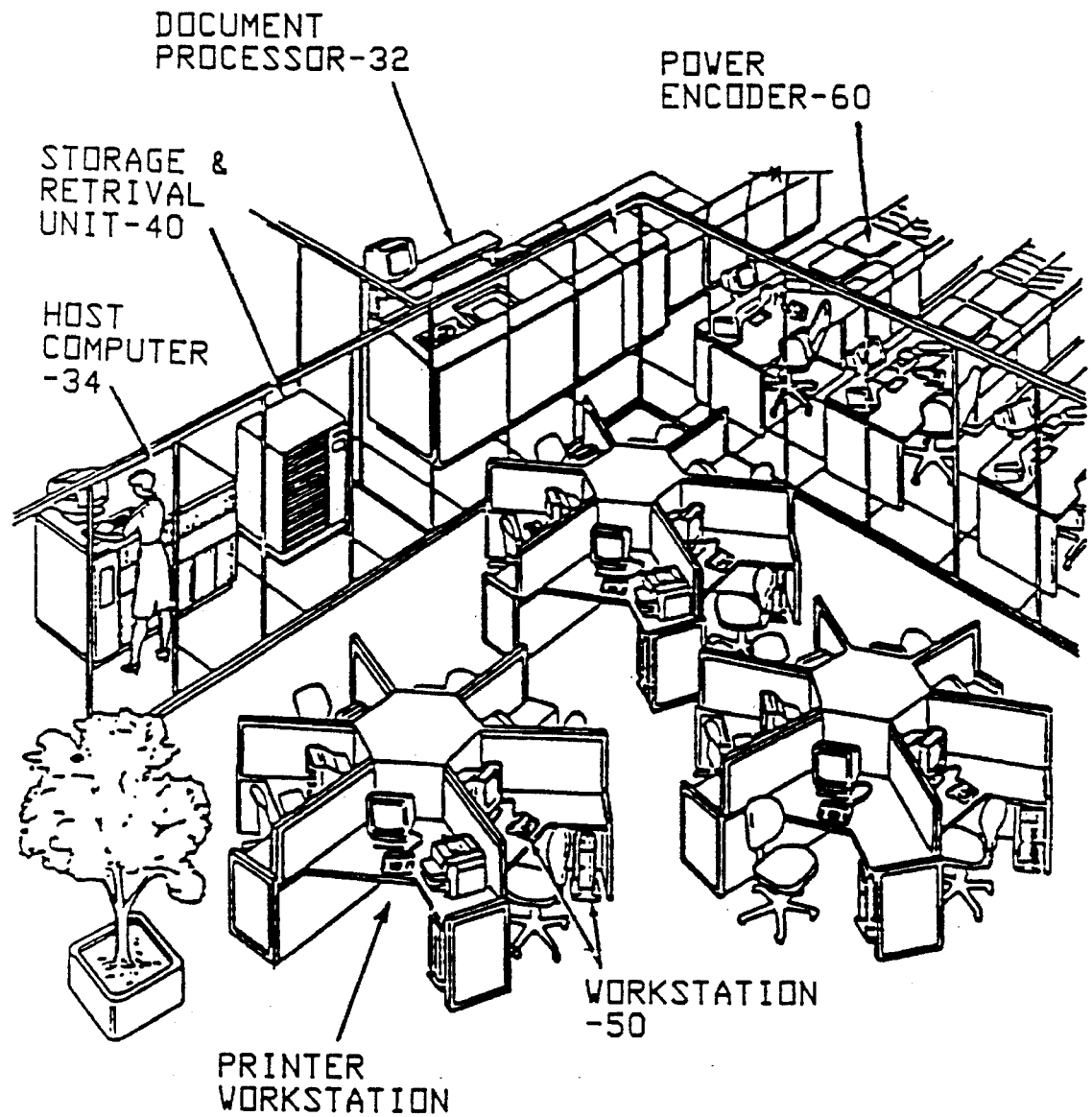
FIG. 2 is a pictorial representation of FIG. 1.

FIGS. 1 and 2 illustrate an exemplary embodiment of an image-based bank check processing system in accordance with the invention, which is able to take particular advantage of imaging technology in a manner which significantly enhances the productivity and cost-effectiveness of the system. As mentioned previously, this bank check processing system is presented by way of example, and should not be considered as in any way limiting the scope of the invention.

An initial step of preparation is required to prepare incoming transactions for processing by the check processing system of FIG. 1. This preparation step involves removing staples, paper clips, rubber bands etc. from the transaction documents, and arranging them in trays with proper orientation and in proper order, each tray corresponding to a block. Included in each tray is a block ticket for identifying the documents in that block, and pocket separator tickets for separating the documents into block groups after they have been sorted into pockets 32a. For the purposes of this description, and, by way of example, it will be assumed that a tray comprises a block of transactions containing about 3,000 documents, and without any transactions being split up between different blocks. To permit identification of the documents associated with each transaction, they are arranged in consecutive order in the tray. Typically, the deposit ticket of each transaction follows the other documents of the transaction.

These tray blocks of transactions are brought to a high speed document processor 32 which includes an imaging capability, and also, optionally includes a microfilming capability and a capability for automatically reading the dollar amounts of the transaction documents. The operator places the tray block into an automatic document feeder of the document processor unit 32 and begins operation. The document processor 32 then reads the MICR code line on each document as the document flows through the unit, endorses audit trail information (including assigning a sequence number) on the document, optionally microfilms the document, and also captures an image of one or more sides of the document. If a document already has the dollar amount encoded, or if automatic dollar amount reading is available, this dollar amount is also read. The document processor 32 then sorts the documents (usually based on MICR data) to pockets 32a using a sort pattern which may be downloaded from a host computer 34 via a communication link 36. As will become evident hereinafter, it is advantageous to sort to pockets 32a based on the destination indicated by the MICR code line in order to facilitate meeting destination shipment deadlines. As will also become evident hereinafter, it is additionally advantageous to permit a defective MICR code line to be sorted to its corresponding pocket, so long as the destination portion is readable. The manner in which such documents having defective MICR code lines, but with readable destinations are handled will be described later on herein. Documents which cannot be handled (e.g., because of a defective MICR line without readable destination) are sorted to a reject pocket for handling by conventional reject reentry procedures. If desired, deposit slips and cash-in and cash-out slips could also be sorted to separate pockets.

The data read from the transaction documents by the document processor 32 are fed to the computer 34 via communication link 36, and typically includes each document's MICR data, Mount data (if read.), assigned sequence number and pocket location. The host computer 34 maintains a data base which stores the pertinent data corresponding to each transaction document being processed.

Images captured by the document processor 32 are processed, compressed, and formed into image packets. Each packet comprises one or more compressed images of a document along with an identifying header containing document identifying data (such as MICR data and sequence number). These image packets are then sent, via a high speed, point-to-point optical network 41 for storage on a high capacity disk-based magnetic storage and retrieval unit 40. The storage and retrieval unit 40 communicates with the computer 34 via communication link 42 and communication processor 34a.

Thus, after a tray block is passed through the document processor 32, the transaction documents will be in the pockets 32a, corresponding document data, such as MICR, sequence number, dollar amount (if read) and pocket location will have been sent to the host computer 34 for storage in its document data base, and corresponding images with document identifying headers will have been stored on the storage and retrieval unit 40.

Additional tray blocks are processed by the document processor 32 in the same manner as described above. In each pocket separator, the pocket tickets provided in the trays during the previously described preparation step serve to separate documents from different blocks. As pockets fill, an operator empties each pocket into a pocket tray which is identified with the corresponding pocket number. These pocket trays are moved to a holding area. When the system indicates that the documents in a particular pocket tray are ready for encoding, the tray may then be taken to a power encoder 60 for high speed encoding of the dollar amount on each check. Since, as mentioned previously, the sorting into pockets is advantageously based on shipping destination, these trays corresponding to destinations having the earliest deadlines, and which the system indicates are ready for encoding, can be encoded before those having later deadlines. In the system being described encoding of the dollar amount by a power encoder 60 is normally permitted only after the dollar amounts of all documents in a tray have been entered into the computer data base and, in addition, all corresponding transactions have been determined to be properly balanced. Batch and/or block balancing may additionally be provided as a further check on proofing accuracy.

Of course, before a transaction can be balanced, the dollar amounts of its documents must be entered into the computer data base. The images of those documents which still require dollar amount entry after being processed by the document processor 32 are sent by the storage and retrieval unit 40, via a local area network 52, to image workstations 50.

As shown in FIG. 1, the illustrated system includes a plurality of image workstations 50 which, in response to receiving images from the storage and retrieval unit 40, serve as the primary operator interface for entering dollar amounts and correction data into the computer data base, and for balancing transactions. The workstations 50 communicate with the computer 34 via network 52 and the storage and retrieval unit 40. Accordingly, data generated at the workstations 50 is sent to the computer 34 by first sending the data, via network 52, to storage and retrieval module 40, which then sends the data, via network 42 and communication processor 34a to the computer 34.

As will be described in further detail hereinafter, the workstations 50 are divided by function into various types: one type of workstations is used to key in dollar amounts by viewing document images;.a second type provides for the correction of MICR code lines, while also providing for amount entry if required; a third type is used to balance transactions; and a fourth type cooperates with a printer to provide text and image hard copy output.

It will be appreciated that proofing (transaction balancing) is required to correct any transaction errors which may be present (to the extent possible) before the checks are encoded by power encoder 60 and shipped to their proper destinations. The transaction documents sorted to the reject pocket by the document processor 32 also have to be entered into the computer data base, since they also belong to transactions which are to be balanced. These rejects are handled by a well known procedure known as reject reentry. The power encoder 60 may be operated in a reject reentry mode for entry of reject data into the computer data base.

When the transactions corresponding to the documents in a pocket tray which require encoding have been determined to be balanced, the pocket tray may then be taken from the holding area to the power encoder 60, which communicates with the computer 34 via communication link 62 and communication processor 34*a*. An operator places the documents from the tray into the input hopper of the power encoder 60 and initiates operation. As the documents pass through the power encoder 60, each pocket separator signals the computer 34 to send to power encoder 60 the amount data for the sequence of checks which follows the pocket separator. The power encoder 60 then encodes the sequence of checks accordingly, using an appropriate printer (not shown). The power encoder 60 may also provide for further sorting of checks based on, for example, destination data contained in the MICR code line, or in response to sorting data derived from the host computer 34. The checks are thus made ready for shipment to their appropriate destinations. Any checks not fed to the power encoder 60, or those checks rejected thereby, are added to their respective group for shipping. The sorting may also be used to remove other types of transaction documents (such as pocket separators, deposit tickets and cash-in and -out slips) by sorting them to a separate pocket. Typically, a cash letter accompanies each shipped group indicating the number and amount of the checks in the group.

Description of Specific Features

Having generally described the exemplary check processing system of FIG. 1, various important advantageous features of the system will next be considered.

Layered Software Architecture.

Figure 8:
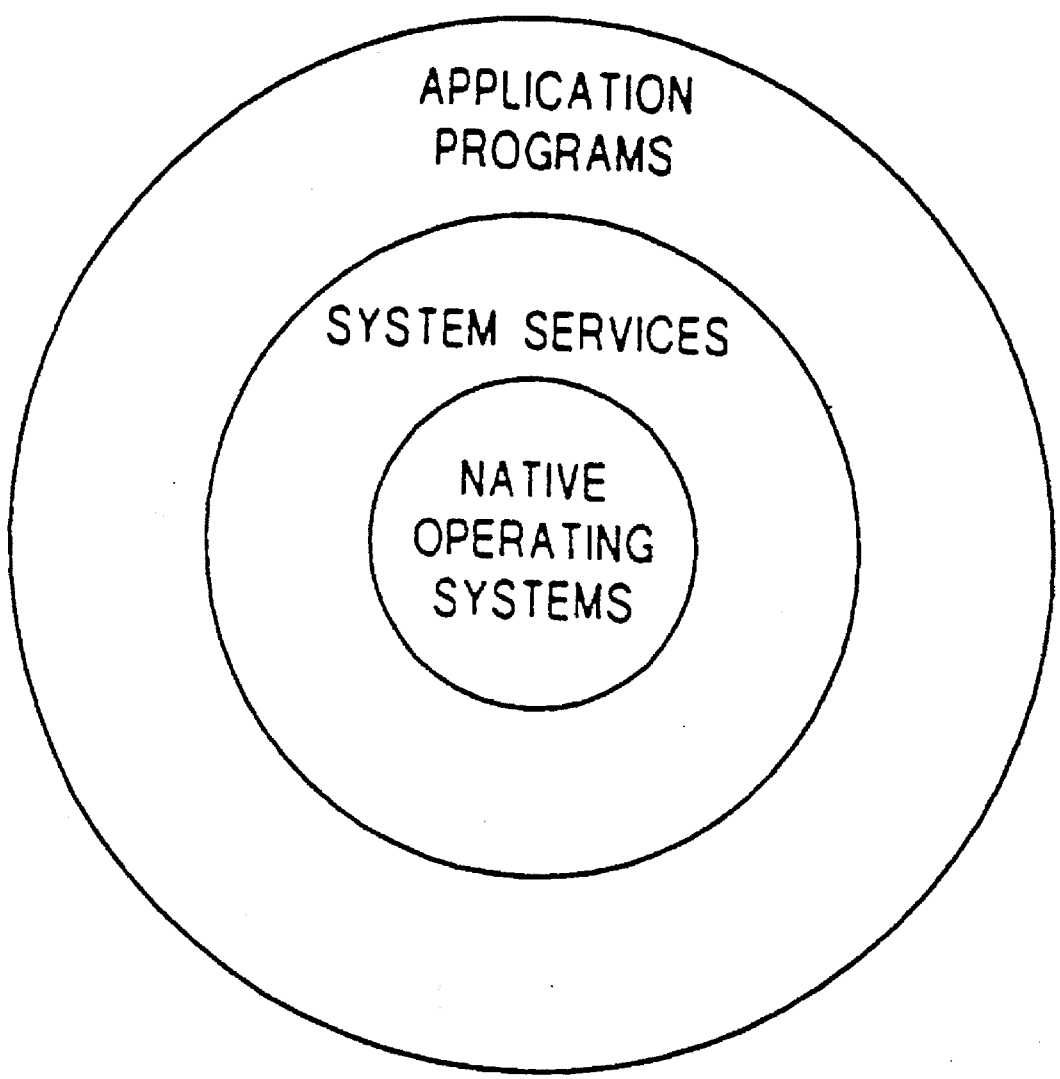
FIG. 8 illustrates the layered software architecture employed in the system of FIG. 1.

As illustrated in FIG. 8, the software architecture provided for the system of FIG. 1 advantageously employs a layered software architecture comprised of application programs, system services and native operating systems which permit the system to serve as a hardware platform applicable to various types of document processing systems. This layered software architecture also permits the cooperative performance of the hardware to be tailored for maximum productivity.

A particular application is composed of application programs that run on different units in the system, each application program being written in the language best suited to its own particular operating environment.

Figure 9:
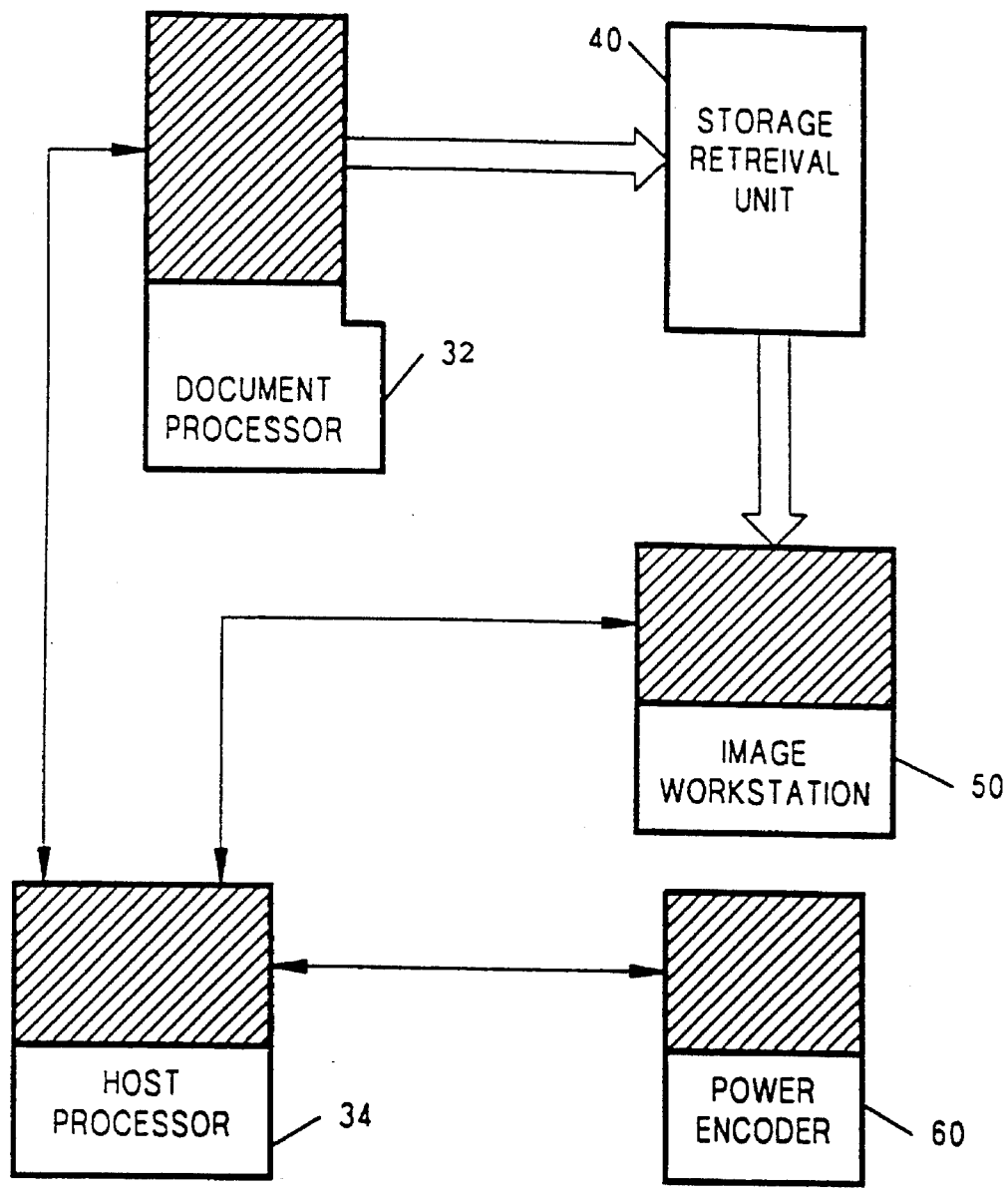
FIG. 9 illustrates the manner in which application programs are distributed throughout the system of FIG. 1.

FIG. 9 illustrates the manner in which such application programs are distributed throughout the system of FIG. 1. It will be seen that application programs (indicated in black) execute on the document processor 32, the host computer 34, the image workstations 50, and the power encoder 60, each of these units having its own native unit operating system.

The system services (FIG. 8) are a library of commands that may be called by application software programs so as to provide an interface between these application programs and the native unit operating systems. More particularly, system service calls are made in the application programming language and provide the ability to interact with all system hardware components and native operating systems. System services provide this interaction independent of any other programming language or operating system restrictions. When a service is requested, the request is translated into commands that the particular involved hardware uses to perform the function.

It will be understood that the system software (application programs, operating systems, system services) may be provided in firmware (ROM), may be loaded into random access memory (RAM), or may be a combination of both. Preferably, the host computer contains the application program software and transfers appropriate portions to the various hardware components during system initialization. As indicated in FIG. 9, this facilitates customizing system operation to the requirements of a particular document processing system.

Figure 10:
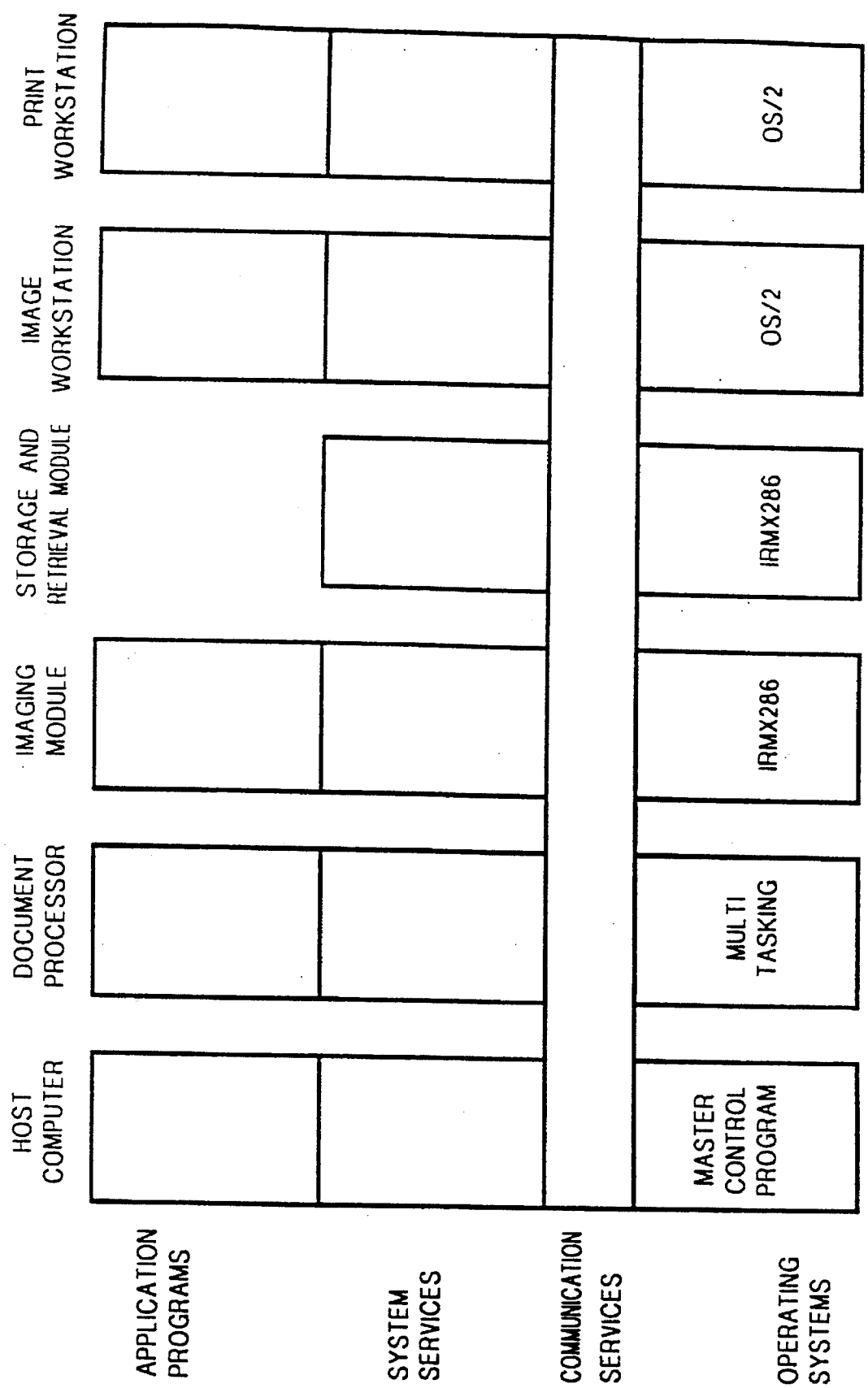
FIG. 10 is a more specific representation of the layered software architecture employed in the system of FIG. 1.

A more specific representation of the layered software architecture employed for the system of FIG. 1 is illustrated in FIG. 10, which diagrammatically shows the four categories into which system software is divided: application programs, system services, communication services (which is a subset of system services), and native operating systems. A summary of each of these categories is presented below:

| | |
|---|---|
| Application programs | Enable the system to perform specific tasks useful to the end user. Application programs call system services to perform program functions. |
| System services | Provide a uniform interface between application programs and system hardware native operating systems. The system services are a commandable system software language which enable applications written in different programming languages to communicate with each other and with the native operating systems. |
| Native Operating systems | Drive the hardware components and interfaces to application programs via the system services. Application programs are written to work with specific system services. |

The following table describes the functions of various types of system services which may typically be provided:

| Type of Service | Function |
|---|---|
| Communication | Provides a mechanism for message-based interprogram and intertask comunications among components. |
| File-Related | Provides the ability to store and retrieve images and other forms of information such as object-code files and program-defined document information. |
| Image | Provides the ability to manipulate document images. |
| Image Capture | Supports the application software on the document |

-continued

| Type of Service | Function |
| --- | --- |
| | processor 32 involved in image capture. |
| Keyboard | Provides an application with the means to access keyboards. |
| Nationalization | Enables applications to choose what language and conventions are to be used for image workstation messages. |
| Notice | Supports the handling and distribution of notices (messages about specific system events) in the system. |
| Print-Related | Provides the ability to generate hard-copy reports and images. |
| Program Management | Provides the ability for a program executing at one location in the system to initiate the execution of programs at image workstations 50, read the status of programs, and terminate programs. |
| Session Management | Provides a basis for supervising, coordinating, and controlling the actions of image workstation operators. |
| System Directory | Provides information about the configuration of the system. |
| Unit Management | Provides the means to acquire information about system components. |
| Window-Related | Enables an application program to manage and manipulate image workstation windows. |

The next following table lists access points "A" and providers "P" for the above system services:

| Type of Service | Doc. Proc. 32 | Store & Retr. Unit 40 | Image Workst. 50 | Print Workst. | Host Comp. 34 |
| --- | --- | --- | --- | --- | --- |
| Communication | | | P/A | P/A | P/A |
| File-Related | | P | A | A | A |
| Image | | | P/A | P/A | P/A |
| Image Capture | P/A | | | | |
| Keyboard | | | P/A | P/A | |
| Nationalization | | | P/A | | |
| Notice | | | A | A | P/A |
| Print-Related | | | P/A | P/A | P/A |
| Prog. Mgt. | | | P/A | P/A | A |
| Session Mgt. | | | P/A | P/A | A |
| Sys. Dir. | | | A | A | P/A |
| Unit Mgt. | P | P | P/A | P/A | P/A |
| Window Rel. | | | P/A | | |

Image processing and Storing

In order to maintain a high rate of document processing, the document processor 32 provides for capturing, processing, and compressing images in real time matching the speed of document flow. The optical network 41 permits the resulting image packets to be sent to the storage and retrieval unit 40 at a sufficiently fast rate so that images are stored on unit 40 at the image capture rate. Thus, images are available for sending to the workstations 50 a very short time after they have been captured by the document processor 32. Retrieval of images can occur one image at a time, or in groups of images defined by a list or range.

To further speed up storage and retrieval operations and increase image throughput, the storage and retrieval unit 40 is designed to provide for the concurrent storage and retrieval of images, that is, storage and retrieval operations are performed in parallel. In addition, operation is such that once written, neither the image nor its header are ever changed (commonly referred to as write-once operation). When an application determines that a block of images is no longer needed (such as when it is determined that all transactions of the block are correctly in balance), the block may then be deleted from the storage and retrieval unit 40. This temporary storage of images by the storage and retrieval unit 40 keeps the unit 40 available for use in storing newly received images.

Figure 11:
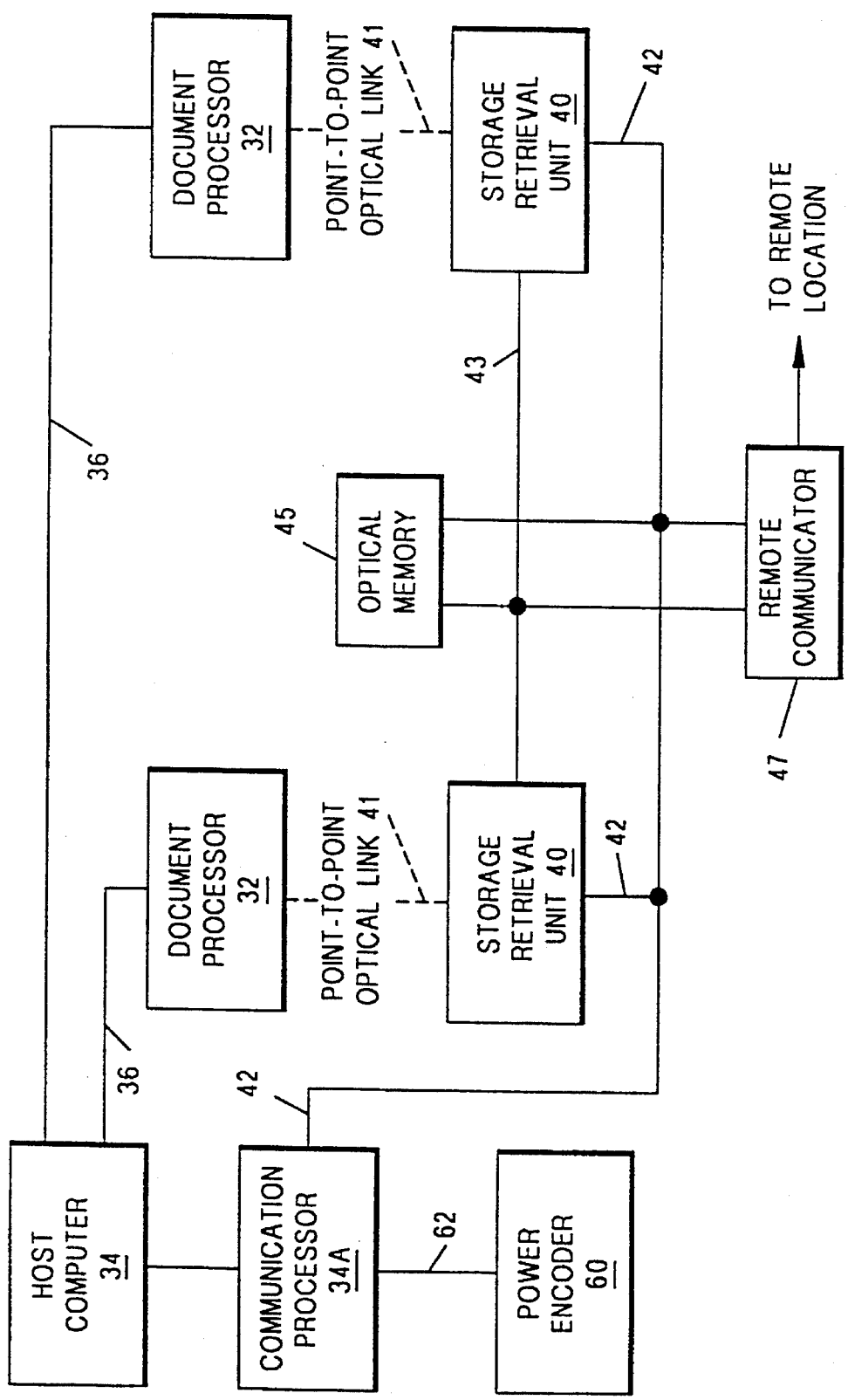
FIG. 11 is a block diagram illustrating how the system of FIG. 1 can be expanded.

FIG. 11 is a block diagram illustrating how the system of FIG. I can be expanded to provide a plurality of storage and retrieval units 40, as well as a corresponding plurality of document processors 32. Note in particular, the provision of communication link 43 which provides for transmitting images between units 40. This advantageously permits a workstation 50 to receive images from any storage and retrieval unit 40 so that the total work load can be shared amongst all the available workstations. FIG. 11 also illustrates how the:storage and retrieval units 40 may communicate, via communication links 42 and 43 with an optical memory 45 and a remote communicator 47. The optical memory 45 provides the capability for archiving images, and the remote communicator provides the capability of transmitting images to a remote location.

Host Computer Unit 34.

The host computer 34 serves as the central control unit for the system of FIG. 1. It coordinates the functioning of the application software running in the system and directs data traffic. The size of the host computer 34 is minimized, since images are routed directly to the separate storage and retrieval unit 40 and do not flow to the computer 34. This separation of the storage and retrieval unit 40 from the computer 34 also provides the additional advantage of being able to use a high speed optical network, such as illustrated by optical network 41, to speed the flow of images from the document processor 32 to the storage and retrieval unit 40. Furthermore, since images do not flow to the host computer unit 34, it may be located at a remote location without the need for the high bandwidth communications which would be required for image transmission.

Image Recovery

As mentioned previously, it is of particular advantage, for example, in order to facilitate meeting shipment deadlines, to provide for the sorting of documents by destination during their initial pass by the document processor (FIG. 1). However, such sorting distributes the documents of a tray block to different pockets. As a result, if for some reason the document images are lost or not available after sorting, it would be very time consuming to collect the documents from the pockets and arrange them back in their original order for a re-pass by the document processor 32. For example, images could be lost or unavailable because the imaging portion of the document processor 32 did not operate properly during the pass, or because the storage and retrieval unit 40 containing the images went down.

Figure 12:
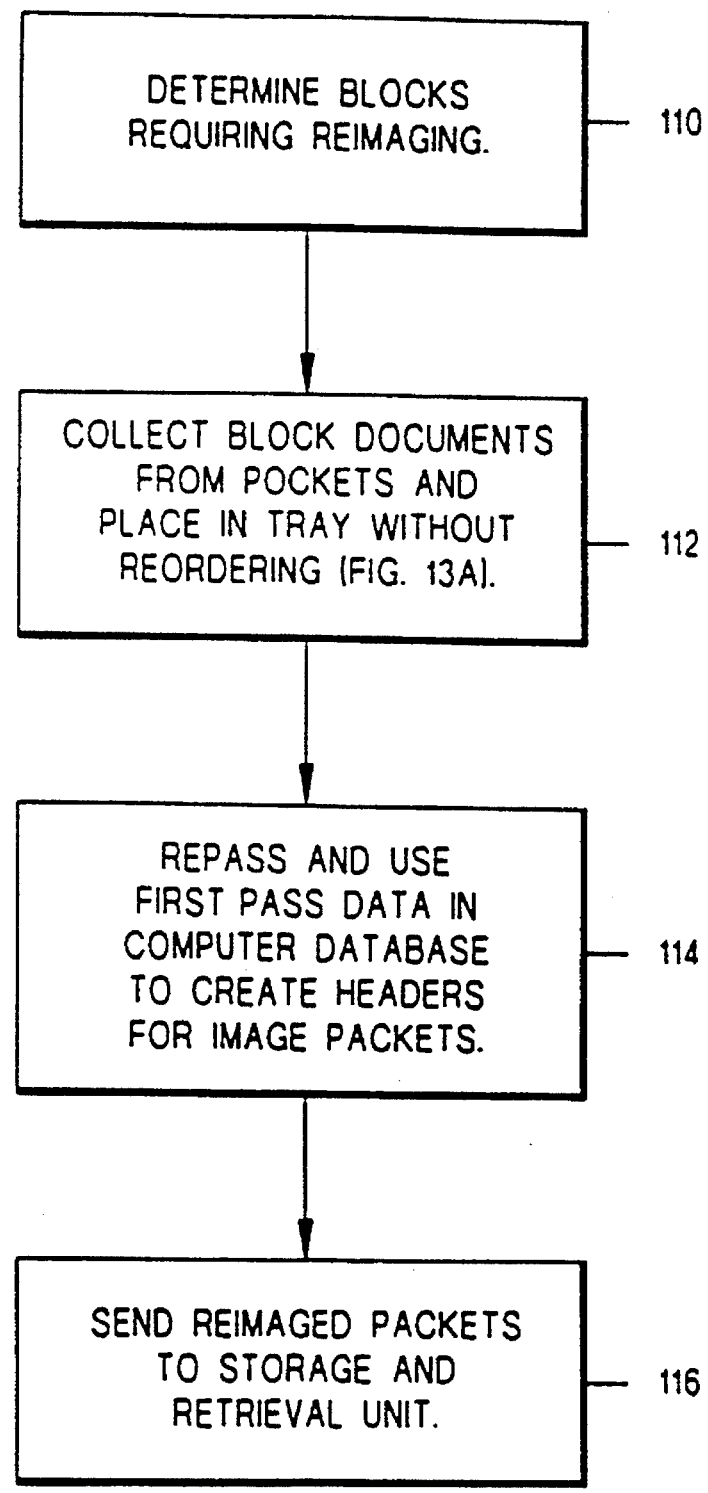
FIG. 12 is a flow chart illustrating how image recovery is provided in the system of FIG. 1.

The above image recovery problem is solved in a particularly advantageous manner such that block documents can be re-imaged without arranging them in their original order. The flow chart of FIG. 12 in conjunction with FIGS. 13 and 14 illustrate how this is accomplished.

Figure 13:
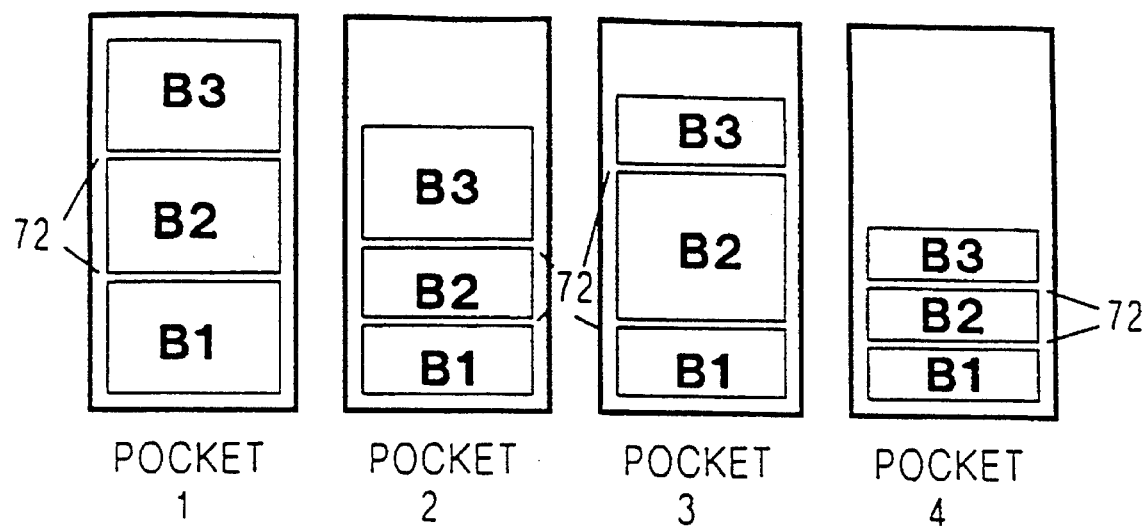
FIG. 13 illustrates how documents may be distributed after sorting by the document processor in FIG. 1.
Figure 13A:
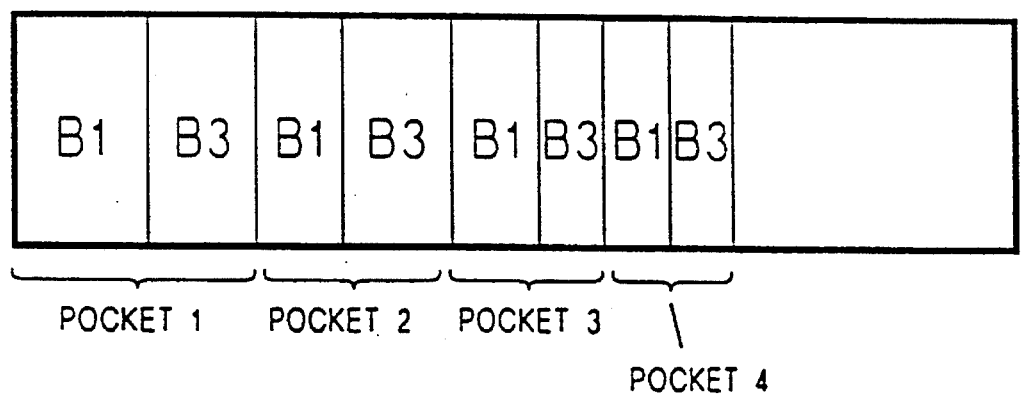
FIG. 13a illustrates how the distributed documents of FIG. 13 are placed in a block tray without reordering preparatory to performing a repass for image recovery purposes.
Figure 14:
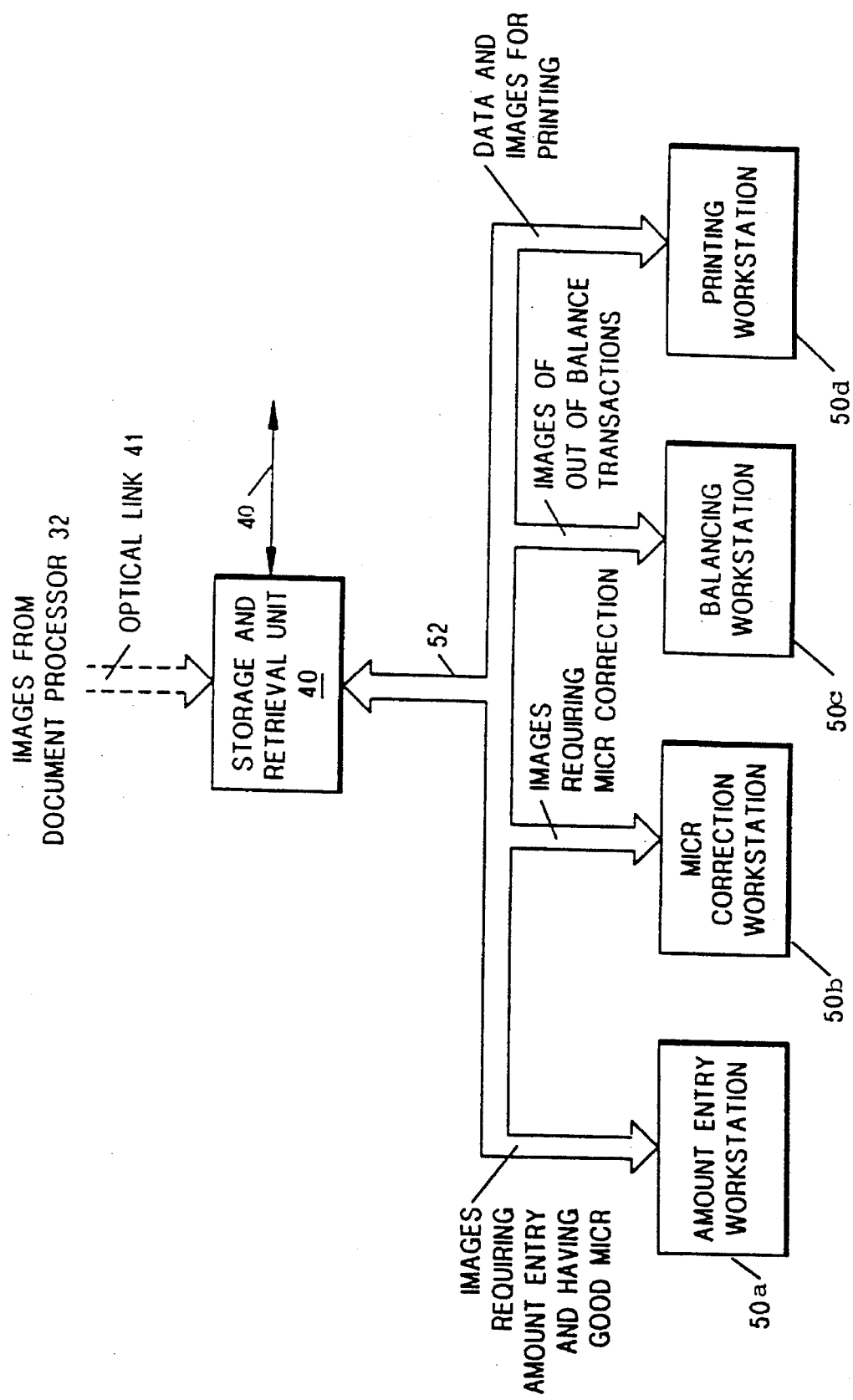
FIG. 14 is a block diagram illustrating various types of workstations employed in the system of FIG. 1.

Refer first to FIG. 13 which is an example of how three blocks B1, B2, and B3 may be distributed amongst four pockets P1, P2, P3, and P4 after sorting by the document processor 32. Pocket separator tickets 72 serve to divide the block documents from one another in each pocket (block tickets are typically sorted to the reject pocket). Assuming it is determined (step 110 in FIG. 12) that blocks B1 and B3 require reimaging, an operator would collect the block B1 and B3 documents from pockets 1, 2, 3, and 4 (along with the pocket separators 72) and place them in a block tray without reordering (step 112), the result being illustrated in FIG. 13a.

During repass (step 114), each pocket separator signals the computer 34 to send to the document processor 32 the first-pass data required to create the headers for the sequence of documents which follows the pocket separator. The document processor 32 uses this first-pass data to create the headers for the images produced during repass, which are then sent to the storage and retrieval unit 40 for storage (step 116 in FIG. 12) in the normal manner. The fact that the images in a stored block on the storage and retrieval unit 40 are not in the original order will not be of concern, since the document sequence number assigned on the first pass will permit the documents of a transaction to be displayed at a workstation 50 in the desired order.

Workstation Operations

Important aspects of the exemplary check processing system being described herein reside in the manner in which provisions are made for prioritizing images sent to the workstations 50, for entering dollar amounts, for handling MICR correction problems, and for performing balancing.

As shown in FIG. 14, the workstation stations 50 include four types of workstations 50a, 50b, 50c, and 50d. The system is designed so that an operator can input priority data into the computer 34 for controlling the order of transmission of transaction documents to these workstations. For example, operation can be prioritized such that those transactions having documents with earlier shipment deadlines will be sent to the workstations 50 earlier than those having later deadlines.

With reference to FIG. 14, the workstation 50a, 50b, 50c, and 50d are dedicated as follows: each workstation 50a is an amount entry workstation and receives images of those documents requiring amount entry and having good MICR code lines; each workstation 50b is a MICR correction workstation and receives images of documents having deficient, but acceptable MICR code lines; each workstation 50c is a balancing workstation and receives images of out-of-balance transactions for the purpose of balancing them with operator assistance; and workstation 50d is a printing workstation which provides for printing text and graphics.

Besides the advantages derived from prioritizing the images sent to the workstations 50, as pointed out in the previous paragraph, the above described workstation dedications provide the further advantage of permitting processing operations to be overlapped. For example, transaction balancing can be performed by workstation 50c on transactions which are ready for balancing (such as those involving high priority documents), while workstation 50a is entering amounts, while workstation 50b is correcting code lines as well as entering amounts, and while workstation 50d is providing printing. As mentioned previously, in connection with FIG. 1, data entered at workstations 50a, 50b, and 50c is sent via communication network 52, storage and retrieval unit 40 and communication link 42 to computer 34 for storage in the computer's data base.

The workstations may, for example, be personal computers providing the functions described herein. Since images are stored in compressed form on the storage and retrieval unit 40, as described previously, each workstation also provides for decompressing received compressed images for display on the workstation monitor. An operator can also zoom, pan, scroll, rotate, and flip (view the rear) an image for optimal viewing. The block diagram of FIG. 15 illustrates a preferred hardware architecture for the image workstations the components of which are described below:

| | |
|---|---|
| System unit 51 | Houses the System Processor 52, power supply, cooling fan, I/O bus, two serial ports, a parallel interface, and expansion card slots (e.g., for expansion memory). |
| System Processor 52 | Contains the microprocessor, memory, and the interface for the keyboards. It also provides socket access to the I/O bus. |
| Disk-drive Controller 53 | Provides the interface for the diskette drive 60 and the fixed-disk drive 61. |
| Workstation LAN (Local Area Network) Controller 54 | Buffers image packets sent from the Storage and Retrieval unit 40 (FIG. 1) before they are displayed on the monitor 59. Executes the communications protocol between the image workstation and the Storage and Retrieval Unit 40. |
| Image Decompressor 55 | Decompresses images (i.e., reverses the compression process that took place in the document processor 32). |
| Display Controller 56 | Generates graphics, manages display memory, defines the screen size, and enables document image manipulation for the high-resolution display monitor 59. |
| Alphanumeric keyboard (optional) 57 | Enables operators to perform basic text processing. |
| Data-entry and function keyboard | Supports high-speed data entry tasks and provides various function controls. |
| High-resolution display monitor 59 | Displays images in four gray levels. |
| Diskette drive 60 | Enables the operator to perform read and write operations on a 3 ½-inch floppy disk. |
| Fixed-disk drive 61 | Provides high storage capacity at the workstation. |

Figure 15:
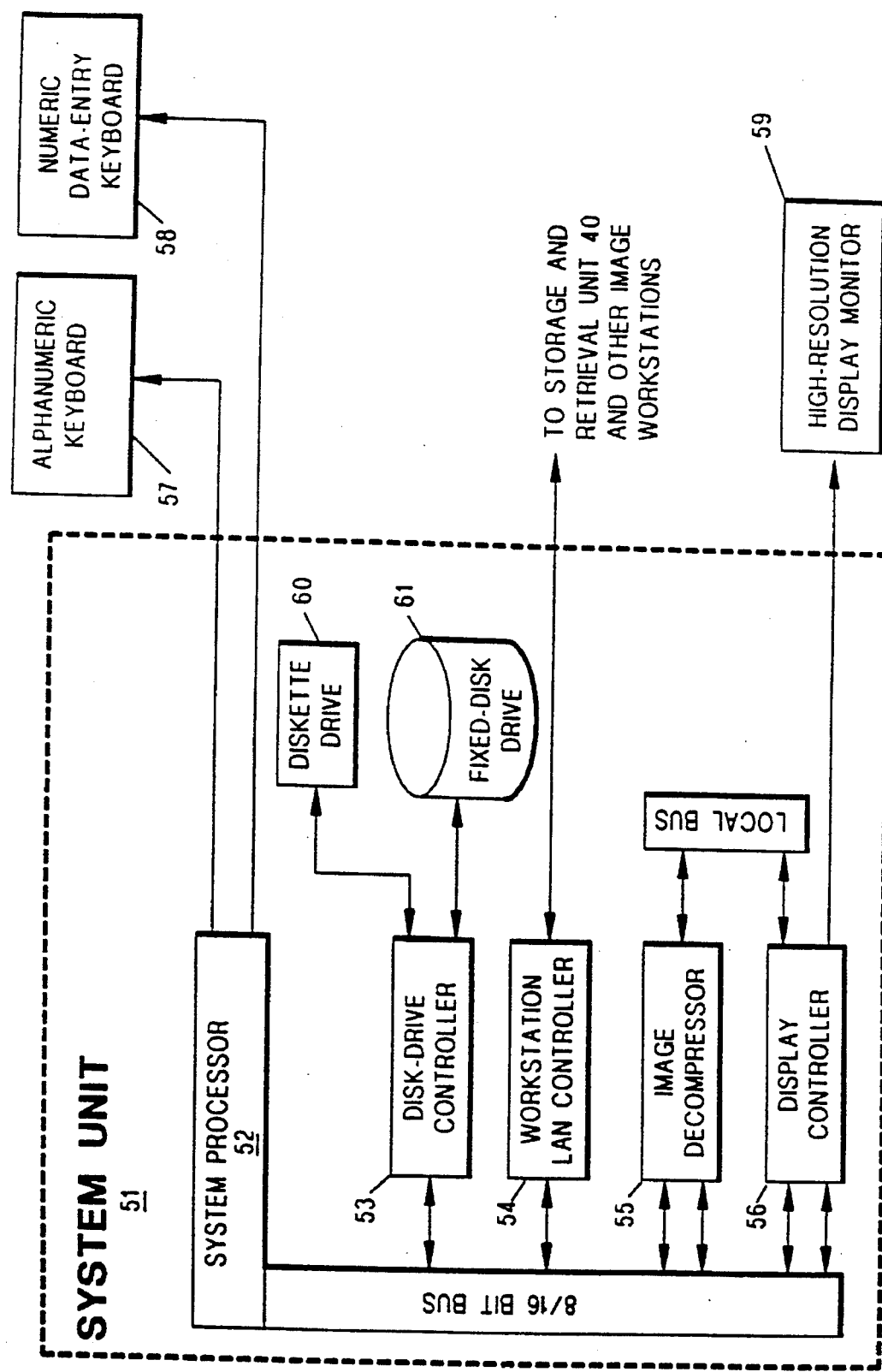
FIG. 15 illustrates preferred hardware for the image workstations of FIG. 14.

It is to be noted that a print workstation 50d is based on the same workstation hardware illustrated in FIG. 15 with the addition of a printer interface and a printer.

The operations of each of the above described types of workstations in the exemplary system being described will next be considered in further detail.

Amount Entry Workstations 50a

It has been found that an unusually high rate of productivity can be achieved by dedicating the operations at a data entry workstation 50a to keying in the dollar amount seen on each document image. A transaction code identifying the type of document (e.g., debit or credit) may also be entered by the operator. As previously described in connection with FIG. 14, only those document images requiring amount entry and having good MICR code lines are sent to workstation 50a.

Figure 16:
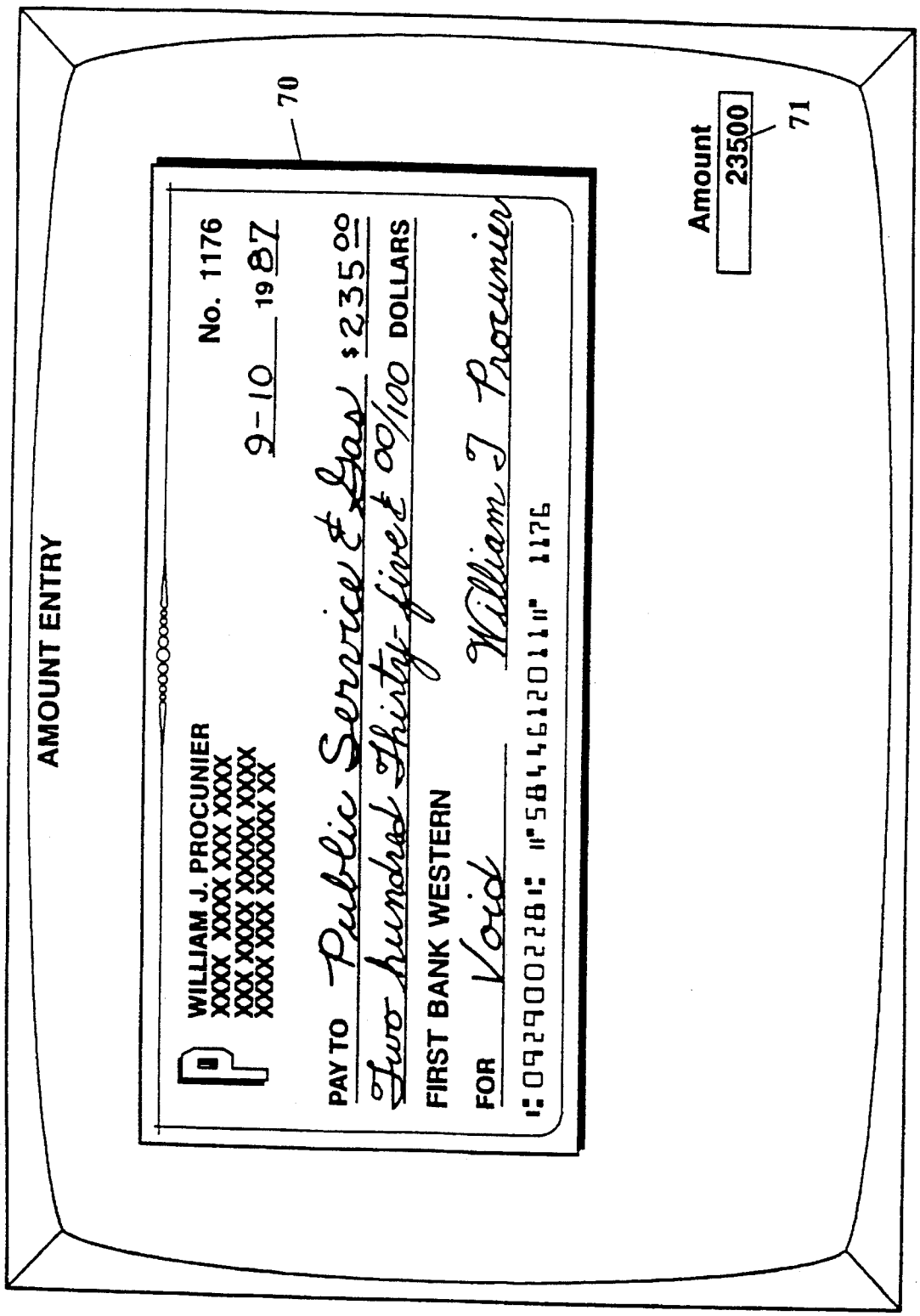
FIGS. 16 and 17 illustrate examples of image displays which may typically appear on an amount entry workstation.

An example of an image display which may typically appear on an amount entry workstation 50a is illustrated in FIG. 16. Note that the operator sees only an image 70 of the document (which in FIG. 16 is a check) along with a box 71 (which is initially blank) labelled "Amount." In FIG. 16, box 71 contains the entry "23500" (decimal point omitted), which is the operator's entry of the observed $235.00 amount of the check. Operation is variably controllable such that the screen will automatically switch to the next document whose amount is to be entered after the operator has entered the first 2, 3, 4, etc. of the observed amount. If the operator cannot read the dollar amount on the document, he/she would merely press a "pass" key, which would then cause the next document to be displayed.

Figure 17:
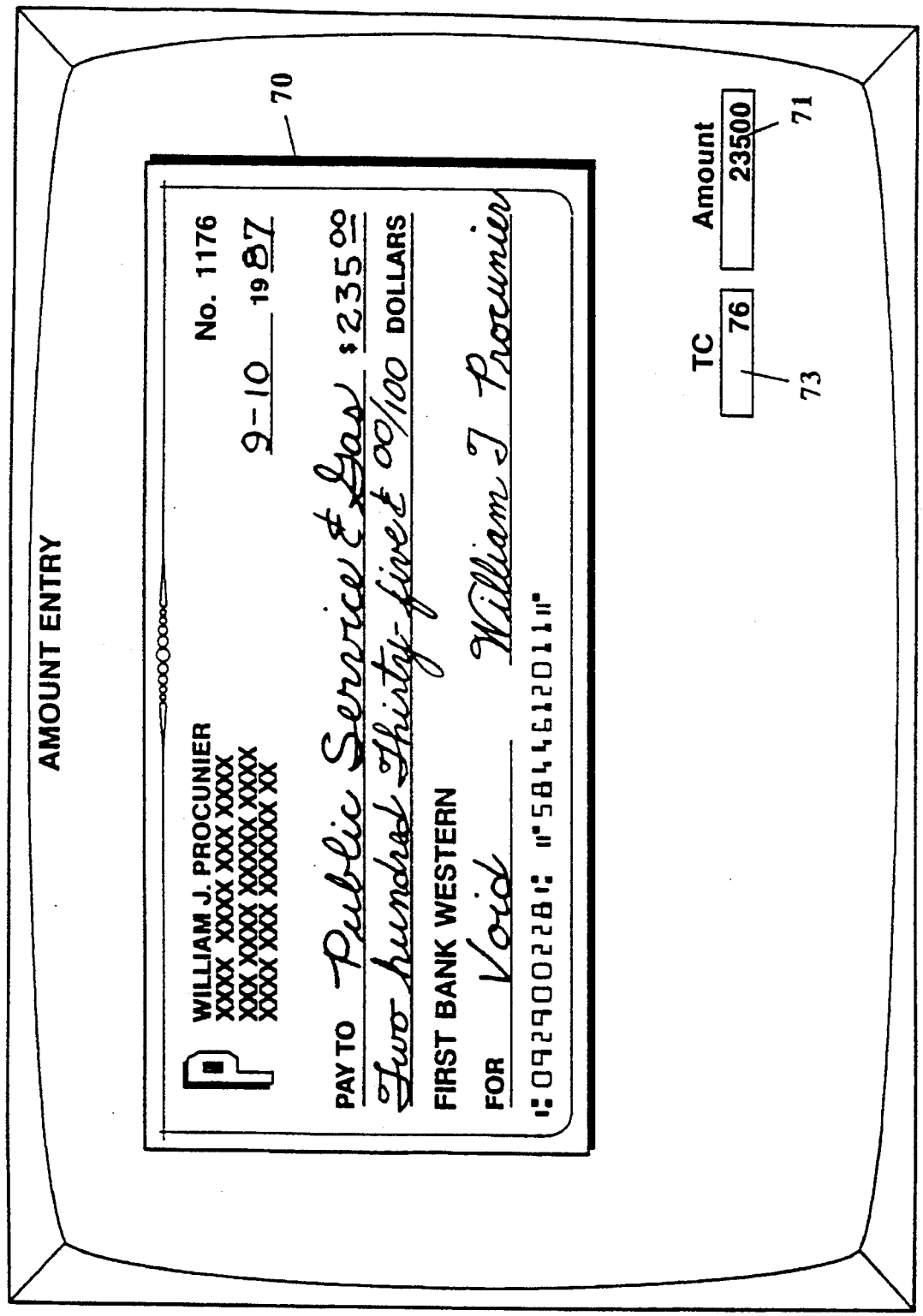

FIG. 17 illustrates an example of a display screen for an amount entry workstation 50a, wherein a transaction code box 73 labelled "TC" is additionally displayed as a result of the operator having keyed in a transaction code indicative of the type of document. Workstation operators will be trained to recognize the type of document (e.g., check, deposit ticket, etc.), and enter the correct transaction code (prior to entering the amount). In FIG. 17, it will be seen that the operator has entered the transaction code "76" in box 73 and the amount "23500" in box 71. To speed up operator processing, operation may alternatively be caused to be such that transaction codes need not be entered for checks, since the system can then assume that a check is indicated when no transaction code is entered.

Since most documents will be directed to an amount entry workstation 50a operating as described above a very high document processing rate is achievable. Furthermore, processing speed is additionally enhanced, since document images are applied to data entry workstations 50a (and in a like manner to workstations 50b) irrespective of what block they are from: in addition the sending of document images to workstations 50a and 50b can advantageously be provided using priorities which may have been entered into the system, as described previously.

While providing for fast amount entry, it is also important that the possibility of errors be minimized to the extent possible. One type of error which has been observed may occur when debit and credit items of a single-item deposit are presented sequentially to an operator. Such a single-item deposit may, for example, comprise a check (debit) $110.00 and a corresponding deposit ticket (credit) of $110.00. If the check is displayed first and the operator misreads it and keys in $100.00, the operator may without thinking key in the same incorrect amount of $100.00 for the next displayed deposit ticket. A variation of this error is the incorrect keying of the first item and the use of a repeat key on the second item. In either case, the transaction balances even though there is an error. Such errors may go undetected until a customer complains.

The exemplary processing system being described herein advantageously avoids the above described error problem by reordering the display of document images in a manner such that the operator will not know which items are associated with which deposit ticket. For example, the images could be reordered such that both items of a single check deposit will be separated by at least one item from each other. This will prevent the single-item-deposit syndrome because the operator will never be able to assume that two successive items have any relation to one another. The table below presents an example of how an image sequence of eleven items maybe reordered:

| Actual Input Sequence | | Displayed Sequence | |
|---|---|---|---|
| 1. deposit | 10.00 | 1. deposit | 10.00 |
| 2. check | 10.00 | 3. deposit | 50.00 |
| 3. deposit | 50.00 | 5. check | 30.00 |
| 4. check | 20.00 | 2. check | 10.00 |
| 5. check | 30.00 | 4. deposit | 20.00 |
| 6. deposit | 95.00 | 6. deposit | 95.00 |
| 7. check | 95.00 | 8. deposit | 105.00 |
| 8. deposit | 105.00 | 10. credit | 35.00 |
| 9. check | 105.00 | 7. deposit | 95.00 |
| 10. deposit | 35.00 | 9. check | 105.00 |
| 11. check | 35.00 | 11. check | 35.00 |

Amount Entry and MICR Correction Workstation 50b

As will be evident from FIG. 14, workstation 50b is dedicated to receiving images of documents requiring MICR code line correction. These images are a result of the decision to sort documents to the document processor pockets 32a (FIG. 1) based on the destination indicated in the MICR code line, even for documents having defective MICR code lines, so long as the destination MICR portion is readable. A significant advantage of providing such operation is that it results in a significant reduction in the number of rejects that require the use of reject reentry procedures, which are slow and labor intensive. In order to facilitate retrieval from the storage and retrieval unit 40 (FIG. 1) of these document images requiring MICR correction, they are stored in a separate code correction file on the storage and retrieval unit 40.

Figure 18:
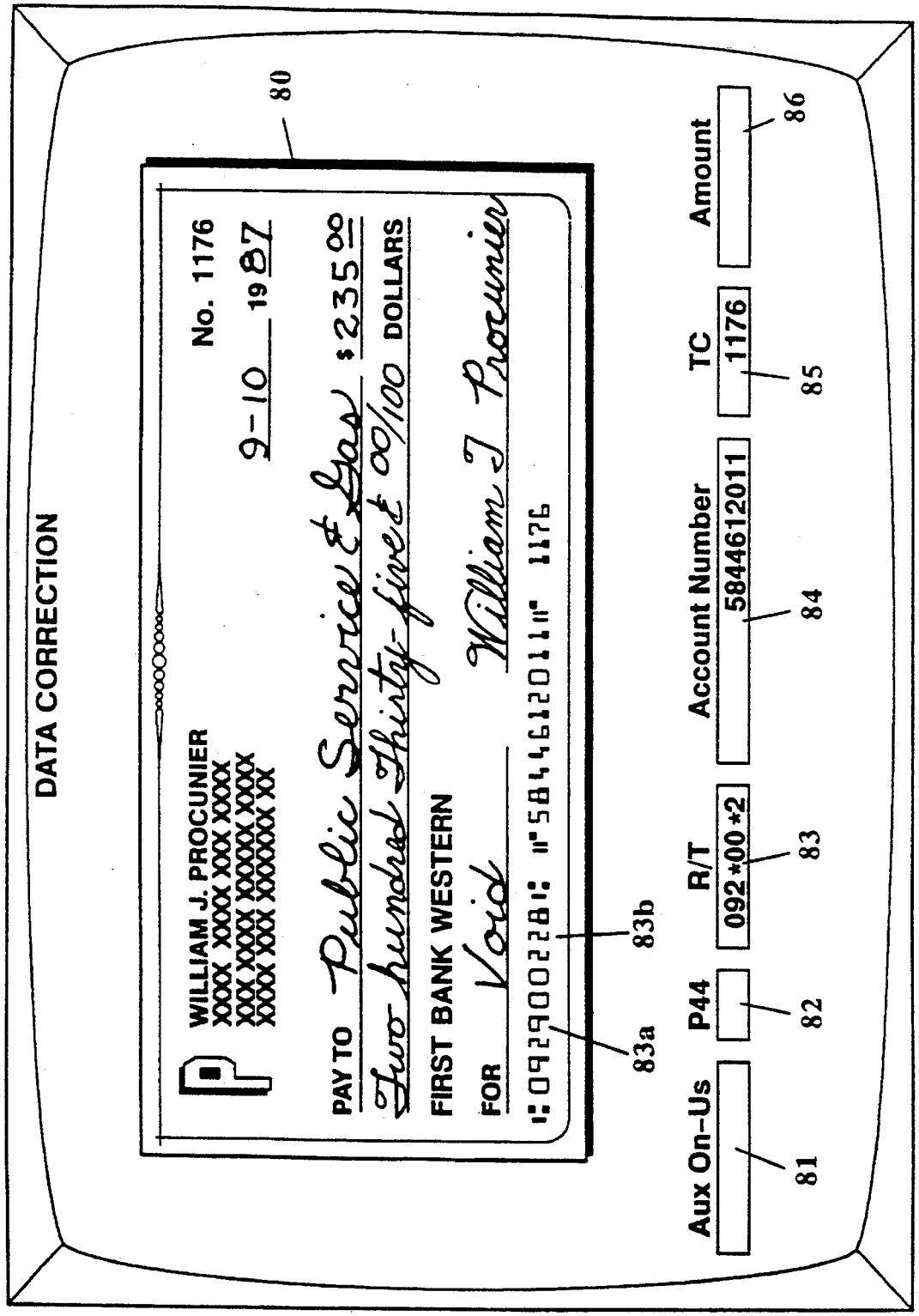
FIGS. 18 and 19 illustrate examples of screen displays which may typically appear on a MICR correction workstation.

The manner in which the code correction workstation 50b typically operates will be understood by reference to FIG. 18 which illustrates a screen display showing the image of a check 80 requiring MICR code line correction, along with a plurality of MICR code line boxes 81, 82, 83, 84, 85, and an amount entry box 86. Box 85 labeled TC is for entry of a transaction code, as previously described with respect to box 73 in FIG. 17. Boxes 81, 82, 83 and 84 labeled Aux On-Vs, p 44, R/T and Account Number, respectively, denote typical divisions well known in the art for code lines, such as 11 and 16 previously described in connection with FIGS. 3 and 4. When the display first appears on the screen, those portions of the MICR code lines which are known (box 84) appear in the appropriate boxes 81 to 85. Those which are not known are left blank. If known, the amount appears in box 86. If a box contains an entry which was only partially readable (box 83), an asterisk "*" appears to indicate each character or number, which needs entry.

In response to the display shown in FIG. 18, an operator would view the displayed check image 80, and substitute "9" (83a) for the first asterisk in box 83, and "2" (83b) for the second asterisk in box 83. The operator would also provide entries for any blank boxes requiring entry, and then would be prompted to enter the check amount $235.00 (and transaction code, if required).The display would then switch to a new document image.

Figure 19:
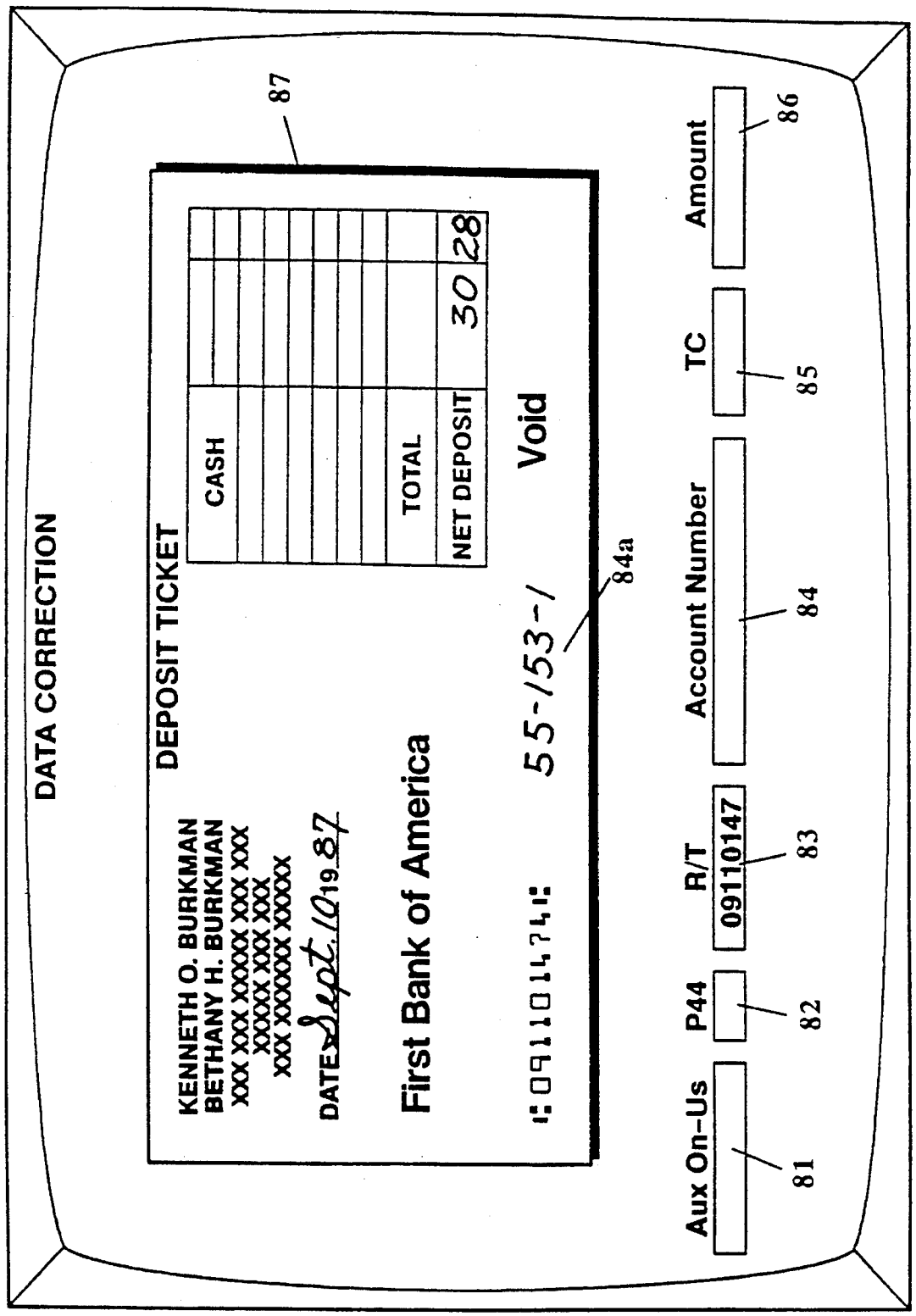

FIG. 19 illustrates a display by the code correction workstation 50b of a deposit ticket 87 in which the account number is handwritten (84a) on the deposit ticket, usually by a teller to identify the account to which the deposit ticket applies. An operator may conveniently enter this handwritten account number in the appropriate box 84 by viewing the document image.

As described in connection with the Mount entry workstation 50a, an operator of a MICR correction workstation 50b can depress a "pass" function key if a required entry cannot be read from the check image.

Balancing Workstation 50c

The balancing workstations 50c receive transactions which do not balance for the purpose of attempting to get them into balance. The workstation 50 is also typically used for balancing blocks and/or batches of transactions. An out-of-balance transaction may, for example, be a deposit transaction for which the total on the deposit ticket (FIG. 4) does not equal the sum of the checks being deposited. Of course, balancing will not be attempted for a transaction until it has had its MICR code corrected by workstation 50b (if necessary), and has had its dollar amount entered or attempted to be entered (either automatically by document processor 32 in FIG. 1, or by imaging using workstation 50a or 50b). The basic manner in which a balancing workstation 50c provides for handling a transaction will next be considered.

Workstation 50c is advantageously provided with a multi-window display (FIG. 20) controlled by a keyboard 90 (FIGS. 21–23). FIG. 21 illustrates the overall layout of the keyboard 90. FIG. 22 illustrates the upper portion 90a of the keyboard, and FIG. 23 illustrates the lower portion 90b of the keyboard. FIGS. 22 and 23 show the labels of the keys. Also included are short description describing the operation of particular keys. The number keys in the center of the lower keyboard portion 90b are for entering numbers.

Workstation 50c is advantageously provided with a multi-window display (FIG. 20) corresponding to a single transaction. It is to be understood that each window is controllable (flip, rotate, scroll, zoom, etc.) using the various window control keys of the keyboard (FIGS. 22 and 23). It is also to be understood that the particular multi-window display and keyboard shown are merely illustrative.

A first window W1 in FIG. 20 displays an image of a deposit ticket 15 indicating a total of $686.30. The other side may be seen by pressing the "Flip" key in the top row in FIG. 22.

A second window W2 in FIG. 20 provides a summary of the transaction derived from the database in computer 34. The "CR" amount (686.30) in window W2 is the deposit ticket total, the "DB" amount (676.30) is the sum of the checks being deposited, and the "DIF" amount (10.00) is the difference between the "CR" and "DB" amounts, that is, the amount by which the transaction is out of balance. Note that window W2 also indicates the number of "CR" and "DR" items, 1 for "CR" (deposit ticket) and 6 for "DB" (checks). Movement between windows is accomplished by using the "Backward Window" and "Forward Window" keys in FIG. 23.

A third window W3 in FIG. 20 labeled "CREDITS" lists each of the "CR" (deposit ticket) amounts. The deposit ticket 15 shown in window W1 is the only listing in window W3 since the displayed transaction has only one credit item.

A fourth window W4 in FIG. 20 labeled "DEBITS" lists each of the "DB" (check) amounts. Accordingly window W3 lists the amount of each of the six debits (checks) whose sum is equal to the total debit "DB" amount in window W2.

A fifth window W5 in FIG. 20 shows a partial image of the particular debit (check) Whose amount is highlighted in window W4, which is the check for 235.00. The particular check which is highlighted can be changed by using the up-or-down keys in FIG. 23. Manipulation of the check shown in window W5, such as scrolling (to see other parts of the check), flipping, etc., is accomplished by appropriate use of particular keyboard keys (FIGS. 22 and 23). It will be understood that, if there were more credit items shown in the credit window W3, window W1 would display the particular credit item highlighted.

A sixth window W6 in FIG. 20 is a dialogue window which is used to permit an operator to dialogue with the computer such as by choosing a particular operation to be performed from a menu. As an example, window W6 illustrates a "CUSTOMER ADVICE MENU". Other types of dialogue activity can also be provided, as will become evident hereinafter.

A seventh window W7 in FIG. 20 at the bottom of the screen shows MICR code line data for a highlighted item in window W3 or W4, dependent upon which immediately preceding window was active. An active window has a thick black border, as illustrated for window W6 in FIG. 20. Movement between boxes (fields) in window W7 is accomplished using the "Backward Field" and "Forward Field" keys in FIG. 23.

Having described an example of the multi-window display capabilities provided by a balancing workstation 50c, the advantageous manner in which transaction balancing is performed will next be considered. Although this description will be directed to transaction balancing, it will be evident therefrom how batch and/or block balancing may also be provided, if desired, for multi-batch deposits as well as for multi-deposit batches.

When an operator signs-on at a balancing workstation 50c for transaction balancing, he or she typically first requests a display of blocks of transaction to be worked on. A screen will then be displayed indicating a plurality of blocks and pertinent information about each, such as the priority of a block, its' current status, the credit, debit, and out-of-balance amounts for the block, etc.

Figure 24:
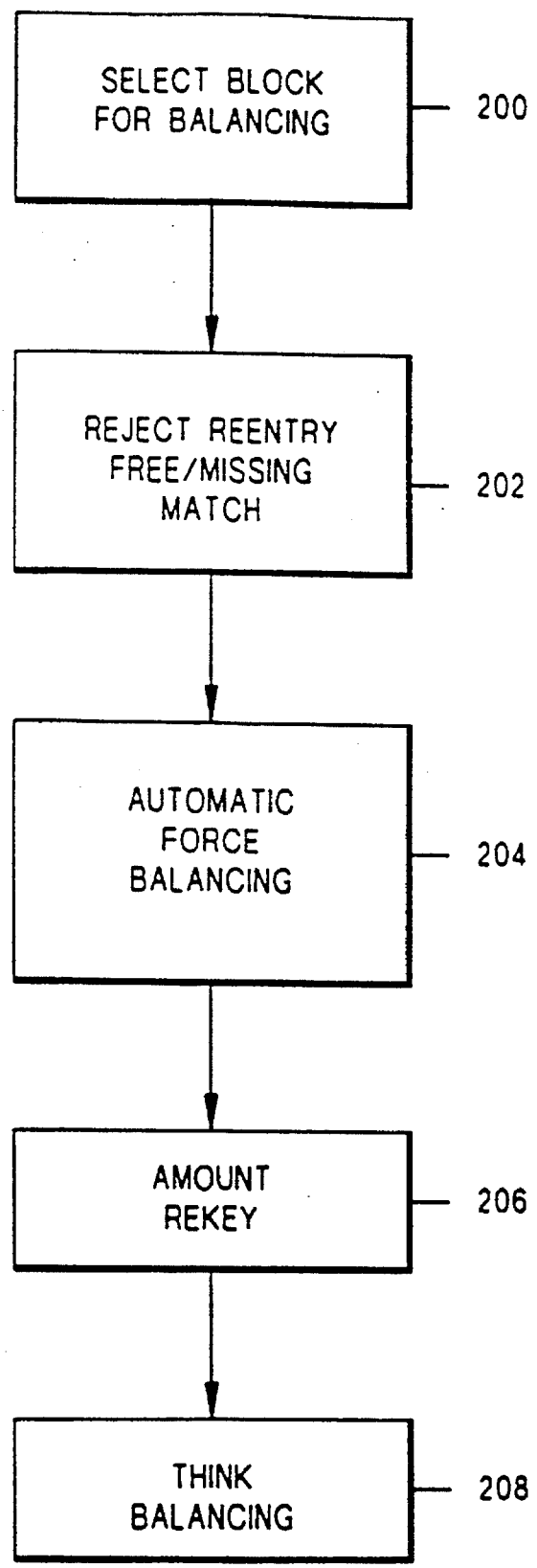
FIG. 24 is a flow chart illustrating the automatic steps through which a balancing workstation leads an operator in order to balance out-of-balance transactions.

The balancing workstation 50c is programmed to automatically lead the operator through various steps in order to attempt to balance out-of-balance transactions. Operation pauses only when operator action is required. These steps are illustrated in FIG. 24 and described in further detail below:

Block Selection (FIG. 24, Step 200)

The initial step is to select a block for balancing.

Reject Reentry Free and Missing Matchup (FIG. 24, Step 202)

The computer 34 (FIG. 1) sends to the balancing workstation 50c the free and missing items from reject reentry. These items are the documents which were entered using reject/reentry procedures, as described previously. Each out-of-balance transaction is examined in turn to determine whether any items are missing from the transaction. If so, a determination is made as to whether any of the free items could be a possible match for any of the missing items. If a possible match is encountered, the image of the missing item and the code line for the free item are displayed to the balancing operator on the workstation screen for verification. The operator simply answers "yes" or "no" to the matchup. Operation proceeds in this manner until all out-of-balance transactions have been handled, after which operation proceeds to the next step.

Automatic Force Balancing (FIG. 24, Step 204)

During automatic force balancing each out-of-balance transaction is examined to determine if any are out of balance by less than a predetermined dollar amount specified by the user. If there are any transactions fitting this description, the transaction is automatically forced into balance without operator intervention. Operation then proceeds to the next step after all out-of-balance transactions have been handled. Any transactions which were balanced as a result of this step are removed from the list of out-of-balance transactions.

Amount Rekey (FIG. 24, Step 206)

The user also specifies the maximum number of items in a transaction that will qualify the transaction for amount rekey. For each out-of-balance transaction which contains less than the number of items specified by the user, the transaction is presented to the balancing operator for rekey. During rekey, the items in the transaction are processed to determine if any are suspects for keying errors. These items are presented to the operator first, followed by all other items in the transaction. If an amount is keyed that equals the amount entered during amount entry, the next item is displayed. If the amount keyed does not equal the amount entered during amount entry, but it causes the transaction to balance, the remaining items of the transaction are not displayed, and operation proceeds to the next out-of-balance transaction. If the amount keyed is not equal to the amount entered during amount entry and the transaction is still out of balance, the amount entered during rekey is taken as the new amount and the next item is displayed. The amount rekey procedure is not performed for those transactions containing PASSED items. After all out-of-balance transactions have been handled, operation proceeds to the next step.

Think Balancing (FIG. 24, Step 208)

This is the step of the balancing function that involves interaction with the balancing operator. At this point, the operator may request a list of the out-of-balance transactions in the block and select the one which is to be subject to think balancing. Alternatively, the system could make this selection automatically. In either case, the think balancing operations are the same.

When an out-of-balance transaction is selected for think balancing, it is examined by the system for errors, as indicated below, to determine if there are suspect items that could be causing the out-of-balance condition.

| KEYING | TRANSACTION LEVEL |
| --- | --- |
| Transpositions | Double Posted Items |
| Shifted Digits | DR Entered as CR, |
| Extra Digits | CR Entered as DR |
| Missing Digits | Misplaced item |
| | Extra Item |
| | Missing Item |
| | Common MICR Misreads |

When the transaction is displayed to the balancing operator (FIG. 20), the first item in each list in the credit and debit windows W3 and W4 that is suspect will be highlighted in order to guide the operator to that item first. There is also an area on the right of the items which can be used to provide comments about the items. For example, if the system considered the suspect item to be an extra item, the comment "extra item" could be provided (not shown in FIG. 20). The dialogue window W6 in FIG. 20 could also be used to provide additional facts.

The operator now tries to use the contents of the display (FIG. 20) to balance the transaction. All of the functions of the keyboard of FIGS. 22 and 23 are available to manipulate the multi-window display, as described previously. The speed at which an out-of-balance transaction can be corrected will be evident by considering the particular transaction display shown in FIG. 20. It is readily apparent from a comparison of the amounts listed on the deposit ticket shown in window W1, with the check amounts listed in window W4, that the $245.00 amount listed on the deposit slip is an incorrect listing, and should be $235.00, which has been highlighted as being suspect in window W4. This is confirmed by the corresponding image of the check in window W5, which is for $235.00.

A further advantage of the multi-window display shown in FIG. 20 is that a customer advice for advising the customer of an incorrect listing (including images) can be prepared at the workstation 50c while the transaction is being displayed. This is accomplished by depressing the "ADVICE" key in FIG. 22, which will produce a menu in the dialogue window W6 to permit the operator to prepare the advice. FIG. 25 illustrates an example of a typical customer advice letter that may be prepared by an operator using the dialogue window W6. Note that images of the deposit slip and check are advantageously provided by the operator requesting same during the operator's dialogue with the dialogue window W6.

If an operator cannot balance a transaction, the operator then presses the "Block Pass" key in FIG. 22, causing a new transaction to be displayed for balancing.

Image Free and Missing Management

The balancing workstation 50a also advantageously provides for handling a situation where a document (item) becomes separated from its transaction, and is erroneously placed with another transaction. This could occur, for example, when preparing documents for the document processor 32 in FIG. 1. Such a misplaced item will be sorted to its proper pocket (assuming its MICR is acceptable); however, the transaction which lost the item, as well as the transaction which gained the item, will not balance. In order to provide for balancing in such situations, computer 34 (FIG. 1) provides a free item store for storing free items. If, during think balancing, an operator determines that an item in window W3 or W4 (FIG. 20) of a displayed transaction is a free (extra) item (e.g., in response to the "Comments" in window W3 or W4 indicating such), the operator can logically remove the item from the transaction and place the item in the free item store. The operator does this by highlighting the item in its respective window (W3 or W4), and then pressing the "Make Free Item" key in FIG. 23. When appropriate, additional identifying data for the document may be provided by the operator using the dialogue window W6.

On the other hand, if an operator, while viewing the display of a transaction during think balancing determines that an item is missing, the operator may want to see what is in the free item store. To do this, the operator presses the "Display Free Items" key in FIG. 23, which causes candidate free items to be displayed in the dialogue window W6 (FIG. 20). The operator can limit the entries displayed by entering free item search data into the dialogue window W6. For example, if the missing item should have an amount of $100.00, the operator by appropriate entry in the dialogue window W6 can limit the free item search to Just those items having an amount of $100.00, in which case, the resulting display in the dialogue window W6 will only be of items having an amount of $100.00. If the operator determines that a displayed free store item belongs to the displayed transaction, the operator can then logically place the missing item in the transaction by pressing the "Get Free Item" key in FIG. 23. If the transaction is thus brought into balance, operation will proceed to the next out-of-balance transaction.

If a missing item is not found for a transaction, the operator can create a missing item advice using the dialogue window W6 (FIG. 20) in a generally similar manner to that previously described for a customer advice (FIG. 25). If at a later time the block containing the missing transaction is worked on again, and the missing item is found (e.g., because the missing item was placed in the free item store after the previous attempt at balancing), the missing item can at this later time be logically placed in the transaction to balance the transaction, as described above. The previously prepared missing item advice will then be deleted. An advice can thus be electronically created at the time it appears to be required (which is the most efficient time to create an advice). Then, if the missing item is found at a later time, the electronically created advice will be deleted and will, thus, not be printed.

The free item store described above is also advantageously employed during the system's transaction level search for "Missing Item" listed in the previously described think balancing error search. When the search detects a missing item in the displayed transaction, candidate items from the free item store will automatically be listed in the dialogue window W6 (FIG. 20) for use by the operator.

Priority Transit Shipment

It will be remembered that the document processor 32 (FIG. 1) sorts documents into pockets based on MICR destination data, after which the documents in each pocket have to wait for their corresponding transactions to be balanced before they can be encoded by power encoder 60 and shipped. For example, particular pockets may contain checks which have to be shipped by a particular deadline which is very near. Of course, they could be power encoded "as is," which is undesirable since there may be checks in this pocket which are from transactions that have not been balanced.

Figure 26:
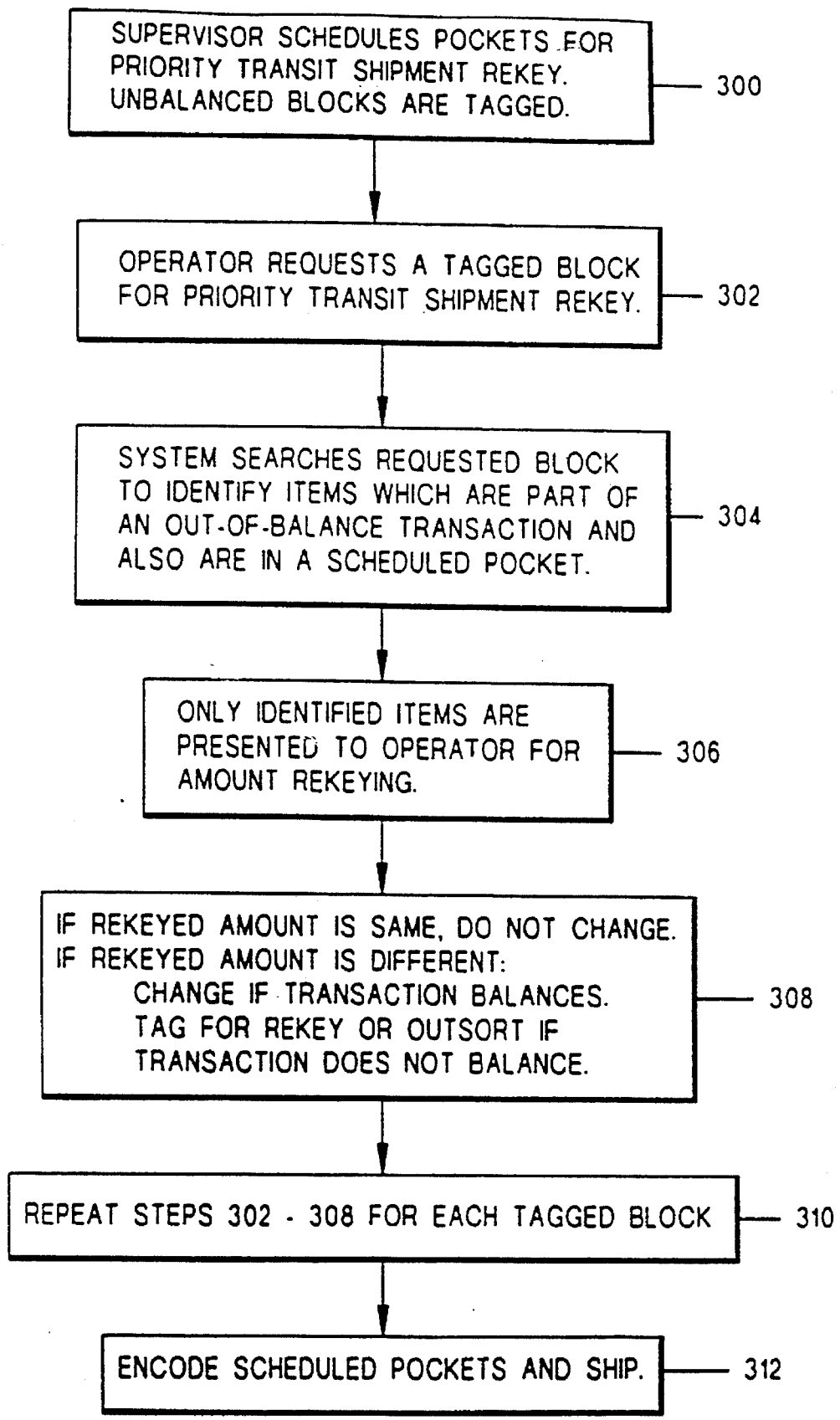
FIG. 26 is a flow diagram illustrating how priority transit shipment is provided in the system of FIG. 1.

The document processing system being described herein provides a particularly advantageous way of handling the above situation, as illustrated by the flow diagram of FIG. 26. As indicated by step 300, a supervisor schedules one or more pockets for priority transit shipment rekey; unbalanced blocks are tagged accordingly. An operator at a balancing workstation 50c (step 302) then requests a tagged block (step 302). The system searches the requested block for items that are part of an out-of-balance transaction and also are in a scheduled pocket (step 304). These items (and these items only) are presented to the operator in the same fashion as during amount entry at an amount entry workstation 50a (step 306). The operator enters the amount as if seeing the item for the first time. The amount that was entered in a previous function is not displayed to the operator. When an amount is entered, one of the following three scenarios takes place (step 308):

(1)—If the amount entered is the same amount that is in the computer data base for this item, this amount is not changed.

(2)—If the amount entered is different from the amount in the computer data base for this item, but the new amount causes the transaction to balance, the data base amount will be changed to this new amount.

(3)—If the amount entered is different from the amount currently captured for the item, and the new amount does not resolve the out of balance condition, the operator may tag the item for a rekey or simply have the item outsorted.

As indicated by step 310 in FIG. 26, steps 302–308 are repeated for all other tagged blocks. The documents in the scheduled pockets are then encoded by the power encoder 60 (FIG. 1) and shipped (step 312). If later balancing reveals an item was incorrectly encoded, an adjustment suspect report is printed to advise that an incorrectly encoded item was shipped.

Enhancing Automatic Amount Reading

It will be remembered from the previous description of the document processor 32 in FIG. 1 that it includes the capability of automatically reading the dollar amounts contained on a transaction, such as, for example, the "$10.00" machine-printed amount shown on the check in FIG. 3, and the "$235.00" handwritten amount shown on the check in FIG. 7. The ability to automatically read such amounts is, of course, of very significant advantage, since it avoids the need for an operator at a workstation 50 to view the document image in order to enter the amount into the data base maintained in the host computer 10. In other words, for every document that is automatically read, there is a corresponding reduction in the number of documents requiring entry by an operator.

Figure 27:
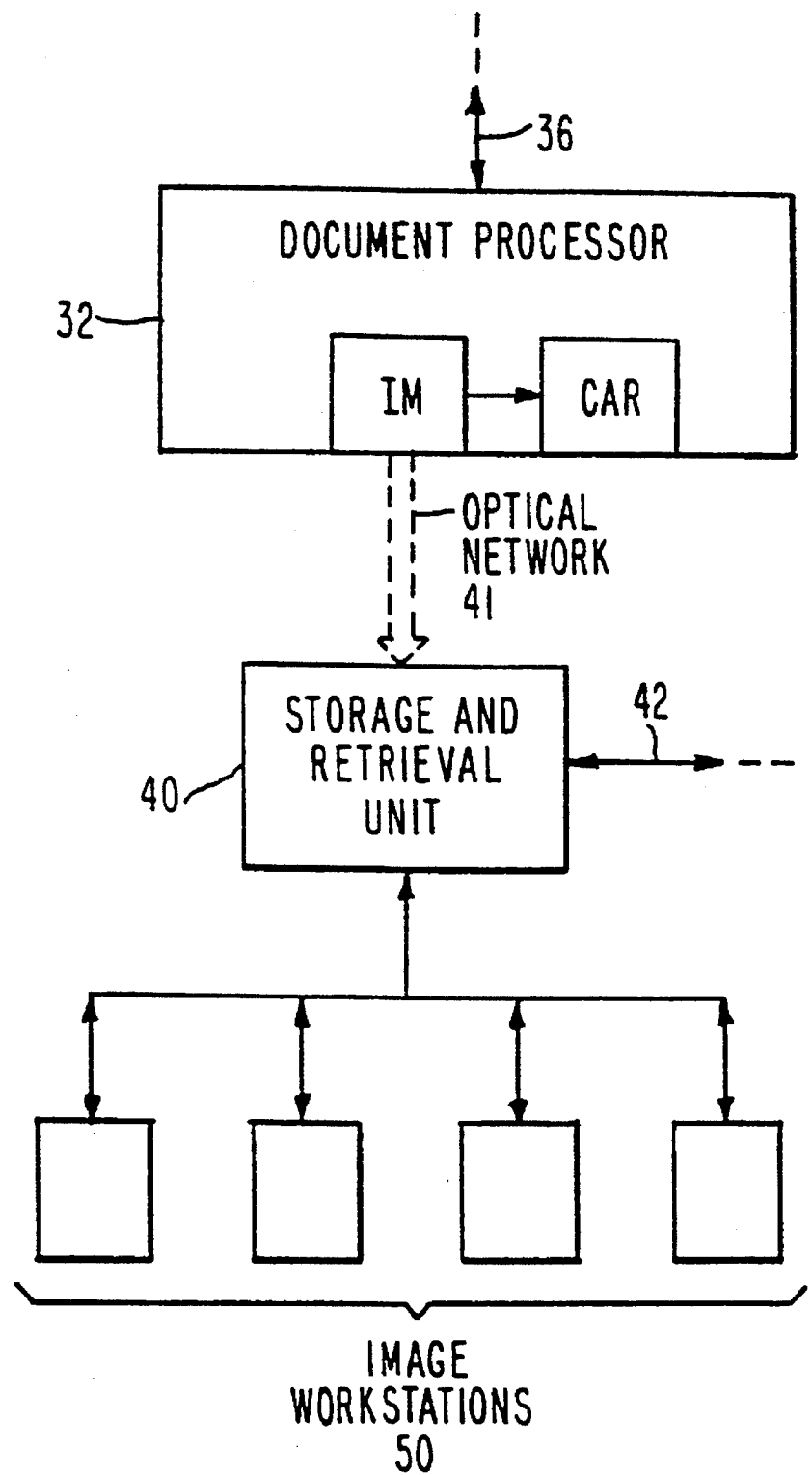
FIG. 27 is a block diagram illustrating portions of the system of FIG. 1 involved in automatically reading financial data on documents processed by the system.

In the preferred embodiment, provision is made to enhance the benefits derivable from automatic amount reading. FIG. 27 illustrates portions of the system of FIG. 1 which will be considered in describing this enhancement.

As shown in FIG. 27, the document processor 32 includes an image module IM and a courtesy amount reader CAR. The image module IM provides for capturing document images, processing and compressing the captured images, and then transmitting the compressed document images via optical network 41 to the storage and retrieval unit 40. The image module IM in FIG. 27 also provides an appropriately processed image to the courtesy amount reader CAR, which attempts to read the printed or handwritten courtesy amount. As is well known in the financial industry, the courtesy amount comprises the numerical digits ("$10.00" in FIG. 3 and "$235.00" in FIG. 7) provided to the right of the payee line.

The courtesy amount reader CAR uses well known character recognition techniques for reading the courtesy amount from the image provided by the image reader module IM. The operations of the image module IM and the courtesy amount reader CAR are performed in "real time" as the documents are being sorted by the document processor 32.

In the preferred embodiment, the CAR may be turned "on" or "off" for particular documents to be processed at the option of the user. This decision may also be determined based on information contained in the document code line (MICR line).

If the CAR is "off" for a document, its amount is entered as described previously, by sending the document image to an appropriate image workstation. A similar result occurs if the CAR is "on," but is unable to successfully read an amount. Such a "can't-read" result may, for example, be determined by CAR based on its confidence in the accuracy of the recognized amount, as determined by a designated risk level. This risk level may be set by the user, by the MICR code line on a document, and/or may change dynamically based on, for example, the number of documents in a transaction or the dollar amounts involved. It will be appreciated that it is important that the risk level be set to minimize substitutions (that is, the acceptance of an incorrectly read amount) since this can significantly increase balancing problems.

If the CAR is "on," two choices may be recorded for the amount read. The first choice is the amount in which the CAR has the most confidence as an accurate read. The second choice is called the "Balance Assist Amount." If a transaction containing an amount read by CAR balances, then there is no need for entry of the amount by an operator at an image workstation. On the other hand, if the transaction does not balance, then the Balance Assist Amount is used to assist in balancing.

In the preferred embodiment of the invention, the Balance Assist Amount is used to assist balancing in a particularly advantageous manner which increases the number of successful automatic reads without unduly increasing the risk of substitutions. This is accomplished in the preferred embodiment by creating the Balance Assist Amount based on determining whether a reasonable alternate digit choice exists for each digit of the first-choice amount. For example, for a particular digit position of an amount, CAR's first choice might be a "3" and a reasonably possible second choice might be an "8." The "8" would then constitute the alternate digit for the corresponding digit position of the Balance Assist Amount. If CAR determines that there is no reasonable second choice for a digit position, then the Balance Assist Amount digit will be the same as the first-choice digit.

The manner in which the Balance Assist Amount is used to assist in balancing in the preferred embodiment will become readily evident from the following examples.

EXAMPLE 1

For this example, it will be assumed that a transaction comprises two items: (a) a check for $123.45 and (2) a deposit slip for $123.45. Since the check and deposit slips agree, the transaction is initially balanced.

Also assume that when the above two items are passed through the document processor, only the check amount is able to be read by CAR, the deposit amount being entered at a workstation. The following results are obtained

| Item | Real Amt. | Workstation or CAR 1st Choice Amt. | CAR Bal. Assist Amt. |
| --- | --- | --- | --- |
| (1) check | $123.45 | $128.45 | $723.62 |
| (2) deposit | $123.45 | $123.45 | None |

Note that the above transaction will not balance because the CAR first choice amount of $128.45 for the check is different from the workstation amount of $123.45 for the deposit. The first step in attempting to balance the transaction is to determine which digit positions of the workstation and CAR first choice amounts are not in agreement. In the preferred embodiment, if agreement failure is found for more than one digit, then no further attempt is made to obtain balancing using the Balance Assist Amount, and the transaction is balanced at a balancing workstation as described previously herein. However, if the level of risk permits, agreement failures in additional digit positions may be permitted for these balance assist operations.

Since only a single digit position fails to be in agreement in the above example (that is, the "8" and "3" in the dollar position), operation proceeds to determine whether the transaction could be made to balance by substituting the corresponding digit of the Balance Assist Amount (which is the dollar digit "3") for its corresponding digit in the first choice amount (which is the dollar digit "8"). It will be evident that this substitution of the "3" in the dollar position of the Balance Assist Amount for the "8" in the first choice amount does produce a balance since both the check and deposit amounts are now $123.45. The substitution could thus be made and there would be no need to have the image of the CAR-read document sent to a workstation. However, dependent upon the risk level, the use of this substitution approach could be limited to use only for agreement failures in the dollar or cents digits, but not for the tens or greater digits. Of course, if a substitution of the corresponding dollar or cents digits of the Balance Assist Amount does not produce a balance, the CAR-read item would be sent to the image workstation for amount entry.

EXAMPLE 2

For this example, assume that a transaction comprises three items: (1) a check for $123.45, (2) a check for $987.65 and (3) a deposit slip for $1,111.10. Since the sum of the checks is equal to the deposit, the transaction is initially balanced.

Also assume that when the above three items are passed through the document processor, only the check amounts are able to read be by CAR, the deposit amount being entered at an image workstation. The following results are obtained:

| Item | Real Amt. | Workstation or CAR 1st Choice Amt. | CAR Bal. Assist Amt. |
| --- | --- | --- | --- |
| (1) check | $987.65 | $987.65 | $631.82 |
| (2) check | $123.45 | $128.45 | $723.62 |
| (3) deposit | $1,111.10 | $1,111.10 | None |

Note that the above transaction will not balance because the sum of the CAR first choice amounts of $128.45 and $987.65 for checks (1) and (2), respectively, does not equal the workstation deposit amount of $1,111.10. The first step in attempting to balance the transaction is to determine which digits are not in agreement. Where more than two items are present in the transaction, digit agreement is determined with respect to the sum of the debits (e.g., checks) and the sum of the credits (e.g., deposits). For this example, the sum of the credits (checks (1) and (2)) is $1,116.10 ($987.65+$128.45), while the sum of the credits (deposit of $1,111.10) is $1,111.10 as shown below:

| Sum of Credits | ($987.65 + $128.45) = $1,116.10 |
| --- | --- |
| Sum of debits | ($1,111.10) = $1,111.10 |

It will be seen that, for the above debit and credit sums, a digit agreement failure is present only for the dollar digits "6" and "1." Accordingly, operation proceeds to determine whether substitution of corresponding digits of the Balance Assist Amounts could produce a balance. Each Balance Assist Amount is tested in turn. For check (1), the dollar digit "1" of the Balance Assist Amount $631.82 is substituted for the dollar digit "7" of the CAR first choice amount $987.65 of check (1). The debit sum is then recalculated and found to be $1,110.10, which still does not equal the credit sum (deposit) of $1,111.10, so that the transaction remains unbalanced. This substitution for check (1) is thus rejected.

The Balance Assist Amount of check (2) is next tested, the dollar digit "3" of the Balance Assist Amount $723.62 being substituted for the dollar digit "8" of the CAR first choice amount $128.45 of check (2). This time the recalculated sum of $1,111.10 does equal the credit sum, so that the transaction is now balanced, in which case the images of the CAR-read checks (1) and (2) need not be sent to an image workstation. If the sum resulting from this substitution for check (2) did not produce a balance, images of all CAR-read amounts in the transaction would be sent to a workstation for amount entry. If dictated by the then applicable risk level, images of CAR-read items would also be sent to an image workstation if the digit agreement failure occurred for digits other than the dollar and cents digits.

It is to be understood that the present invention is not limited to the particular implementations and/or examples disclosed herein, and is accordingly to be considered as including all modifications and variations coming with the scope of the appended claims.

What is claimed is:

1. In a transaction processing system, wherein a transaction comprises credit and debit documents which should balance, wherein said system includes an automatic amount reader for automatically reading document amounts from at least some of said documents, and wherein each amount comprises a plurality of digits at respective digit positions, a method for automatically correcting a document amount which has been incorrectly ready by said automatic amount reader, said method comprising:

providing a first digit choice and a second digit choice for at least one digit position of a document automatically ready by said automatic amount reader, each first digit choice being the one which said automatic amount reader determines as most likely to be correct;

extracting the amount from each document of said transaction which is not automatically read by said automatic amount reader, each extracted amount comprising a plurality of digits at respective digit positions;

determining from the first choice digits and extracted digits of documents making up a transaction whether it is an out-of-balance transaction;

determining a digit position in error for said out-of-balance transaction; and substituting a second digit choice for the first digit choice of an automatically read document of said out-of-balance transaction at the digit position in error to attempt to automatically balance said out-of-balance transaction.

2. The method of claim 1, wherein the step of extracting includes displaying a document of said transaction which is not automatically read for deriving the amount digits thereon.

3. The method of claim 1, wherein a second choice amount is derived by determining the next most likely digit at the corresponding digit position of the amount.

4. The method of claim 3, wherein a second choice digit is chosen the same as its corresponding first choice digit when there is no suitable next most likely digit at the corresponding digit position of the amount.

5. The method of claim 1, wherein the step of determining a digit position in error comprises comparing the sum of the debit and credit amounts at that digit position.

6. In a transaction processing system, wherein a transaction comprises credit and debit documents which should balance, a method comprising:

extracting amount from said documents;

said extracting including automatically reading amounts on at least a plurality of said documents and providing a first amount choice and a balance assist amount in response to each automatic reading of an amount, said first amount choice comprising a plurality of first choice digits at respective digit positions and said balance assist amount comprising a second choice digit for at least one digit position;

said extracting also including deriving amounts comprised of a plurality of digits at respective digit positions from documents which are not automatically read;

identifying an out-of-balance transaction by determining whether extracted amounts from documents making up each transaction are in balance, the first amount choice being used for each automatically ready amount;

determining a digit position in error by comparing the sum of the debit and credit amounts at that digit position; and correcting an amount incorrectly read by said automatically reading at the digit position in error by substituting for a first choice digit at the digit position in error a corresponding second choice digit of a balance assist amount and then testing whether the substitution causes the out-of-balance transaction to balance.

7. The method of claim 5 or 6, wherein automatic balancing is not attempted if there is an error at more than one digit position.

8. The method of claim 5 or 6, wherein balancing is attempted only if the error is located at a predetermined digit position.

9. The method of claim 1, 5 or 6, wherein said out-of-balance transaction includes at least two documents which are automatically read, and wherein the step of substituting tests whether substitution of any of the second choice digits of the automatically read amounts at the digit position in error will cause said transaction to balance.

10. The method of claim 1, 5 or 6, including displaying at a workstation the image of a document for which an amount is incorrectly read by said automatically reading if said substituting does not provide correction.

* * * * *